US009350451B2

(12) United States Patent
Kolze et al.

(10) Patent No.: US 9,350,451 B2
(45) Date of Patent: May 24, 2016

(54) SIGNAL DETECTION FOR OPTICAL TRANSMITTERS IN NETWORKS WITH OPTICAL COMBINING

(75) Inventors: Thomas J. Kolze, Phoenix, AZ (US); Victor T. Hou, La Jolla, CA (US); Bruce J. Currivan, Dove Canyon, CA (US)

(73) Assignee: BROADCOM CORPORATION, Irvine, CA (US)

( * ) Notice: Subject to any disclaimer, the term of this patent is extended or adjusted under 35 U.S.C. 154(b) by 1601 days.

(21) Appl. No.: 12/765,821

(22) Filed: Apr. 22, 2010

(65) Prior Publication Data

US 2010/0272447 A1  Oct. 28, 2010

Related U.S. Application Data

(60) Provisional application No. 61/171,811, filed on Apr. 22, 2009, provisional application No. 61/218,400, filed on Jun. 18, 2009.

(51) Int. Cl.
*H04B 10/2575* (2013.01)
*H04B 10/50* (2013.01)
*H04B 10/54* (2013.01)
*H04B 10/564* (2013.01)

(52) U.S. Cl.
CPC .......... *H04B 10/25751* (2013.01); *H04B 10/50* (2013.01); *H04B 10/54* (2013.01); *H04B 10/541* (2013.01); *H04B 10/564* (2013.01)

(58) Field of Classification Search
None
See application file for complete search history.

(56) References Cited

U.S. PATENT DOCUMENTS

| 5,483,372 | A | * | 1/1996 | Green, Jr. ...................... 398/175 |
| 6,021,144 | A | * | 2/2000 | Meyer et al. ................ 372/38.02 |
| 6,222,338 | B1 | * | 4/2001 | Villaret ....................... 318/568.13 |
| 6,433,904 | B1 | * | 8/2002 | Swanson et al. ................. 398/91 |
| 8,145,165 | B1 | * | 3/2012 | Su et al. ...................... 455/232.1 |

* cited by examiner

*Primary Examiner* — Darren E Wolf
(74) *Attorney, Agent, or Firm* — Garlick & Markison; Bruce E. Stuckman

(57) ABSTRACT

Signal detection for optical transmitters in networks with optical combining. Presented herein is a multi-faceted means for performing electrical to optical conversion such as in an optical transmitter as implemented within a communication system including at least some optical communication links therein. The turning on and turning off of a light source (e.g., a laser diode (LD), a light emitting diode (LED), and/or other component that performs electrical to optical conversion) is performed in accordance with a number of operational parameters. Some communication systems include multiple optical links (e.g., multiple fiber-optic links) from multiple transmitters that connect to a common receiver. In addition, some optical transmitters include multiple electrical links (e.g., multiple electrical communication links) from multiple communication devices that connect thereto.

20 Claims, 24 Drawing Sheets

SIGNAL DETECTION FOR OPTICAL TRANSMITTERS IN NETWORKS WITH OPTICAL COMBINING

CROSS REFERENCE TO RELATED PATENTS/PATENT APPLICATIONS

Provisional Priority Claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 61/171,811, entitled "Signal detection for optical transmitters in networks with optical combining,", filed Apr. 22, 2009.

2. U.S. Provisional Application Ser. No. 61/218,400, entitled "Signal detection for optical transmitters in networks with optical combining,", filed Jun. 18, 2009.

INCORPORATION BY REFERENCE

The following U.S. Utility Patent Applications are hereby incorporated herein by reference in their entirety and made part of the present U.S. Utility Patent Application for all purposes:

1. U.S. Utility application Ser. No. 10/142,189, entitled "Cancellation of interference in a communication system with application to S-CDMA,", filed May 8, 2002, now U.S. Pat. No. 7,110,434 B2, issued on Sep. 19, 2006, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/367,564, entitled "Cancellation of interference in a communication system with application to S-CDMA,", filed Mar. 26, 2002.

The U.S. Utility application Ser. No. 10/142,189, also claims priority pursuant to 35 U.S.C. §120, as a continuation-in-part (CIP), to the following U.S. Utility Patent Application which is hereby incorporated herein by reference in its entirety and made part of the present U.S. Utility Patent Application for all purposes:

2. U.S. Utility application Ser. No. 09/652,721, entitled "Subdimensional single carrier modulation,", filed Aug. 31, 2000, now U.S. Pat. No. 6,778,611 B1, issued on Aug. 17, 2004, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/151,680, entitled "Subdimensional single carrier modulation,", filed Aug. 31, 1999.

3. U.S. Utility patent application Ser. No. 09/878,730, entitled "System and method for canceling interference in a communication system,", filed Jun. 11, 2001, now U.S. Pat. No. 6,798,854 B2, issued on Sep. 28, 2004, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/262,380, entitled "System and method for canceling interference in a communication system,", filed Jan. 16, 2001.

BACKGROUND OF THE INVENTION

1. Technical Field of the Invention

The invention relates generally to communication systems including at least some optical communication links therein; and, more particularly, it relates to operating and processing as performed in accordance with electrical to optical conversion of signals within such communication systems.

2. Description of Related Art

Data communication systems have been under continual development for many years. There are a wide variety of types of communication systems implemented using various types of communication media (e.g., wired communication systems, wireless communication systems, optical communication systems, and various combinations thereof that include components and links of various types therein [such as a communication system including wired, wireless, and/or optical communication links]).

Certain communication systems employ one or more of various types of coding (e.g., error correction codes (ECCs) whose decoding may be performed iteratively) to ensure that the data extracted from a signal received at one location of a communication channel is the same information that was originally transmitted from another location of the communication channel. Communications systems with iterative codes are often able to achieve lower bit error rates (BER) than alternative codes for a given signal to noise ratio (SNR).

In addition, various types of communication systems may employ one or more of various types of signaling (e.g., orthogonal frequency division multiplexing (OFDM), code division multiple access (CDMA), synchronous code division multiple access (S-CDMA), time division multiple access (TDMA), etc.) to allow more than one user access to the communication system. Such signaling schemes may generally be referred to as multiple access signaling schemes.

In some communication systems that include both electrical and optical components and com links therein, there seems to be an ever-increasing movement to increase the amount of optical related infrastructure therein. For example, for over a decade, there has been an ongoing movement to implement "fiber to the house" such that a communication links all the way to an end user (e.g., a cable modem subscriber in a residential home) are implemented using optical means (e.g., fiber-optic communication links). As is known, optical communications often provide certain advantages and benefits over electrical based communications (e.g., greater bandwidth, greater throughput, dielectric nature of the communication media, etc.). However, even within such communication systems that do include optical components and communication links therein, there are both electrical to optical and optical to electrical conversion of signals therein within various components.

Within multiple access communication systems in which more than one communication device communicates via a common optical communication link serviced by one or more optical transmitters (that effectuates the electrical to optical signal conversion therein), including cases where the combining is passive combining, and with or without amplification, there is a need to manage and control the multiple access to such an optical transmitter, and specifically, there is a need to manage and control the turning on and off of such an optical transmitter, in part to reduce the instances of optical beat interference (OBI) and increase in noise and distortion which may result if a plurality of optical transmitters are active simultaneously. The means existent in the prior art are simply inadequate to deal with the many issues inherent to such communication systems.

BRIEF SUMMARY OF THE INVENTION

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

Figure 20:
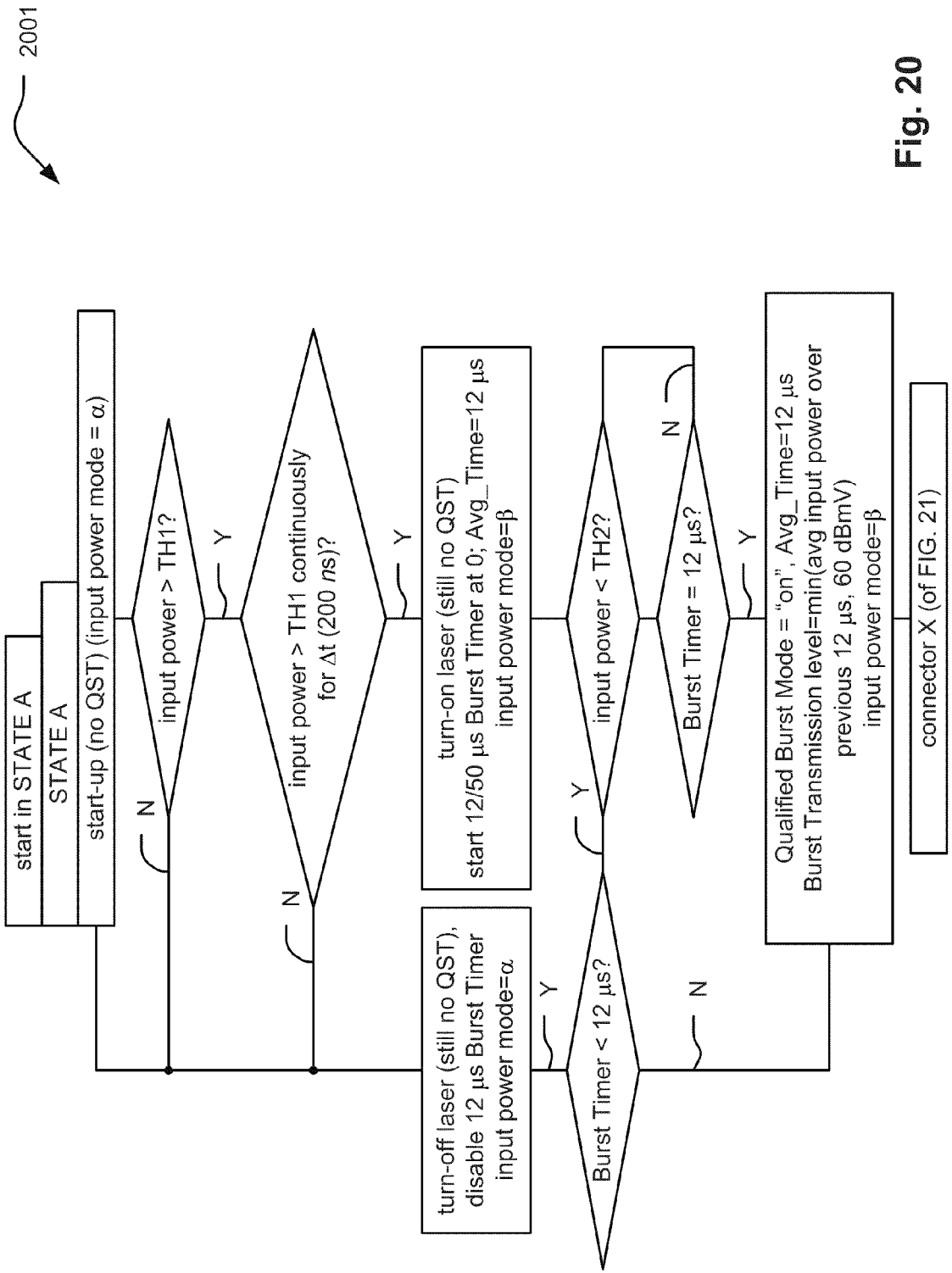
FIG. 20, FIG. 21, FIG. 22, FIG. 23, and FIG. 24, considered together, illustrate an alternative embodiment of a combined method of performing signal detection in accordance with optical transmitters, including adaptive threshold for turn-on, absolute threshold for turn-on, and automatically transitioning between the two modes.
Figure 21:
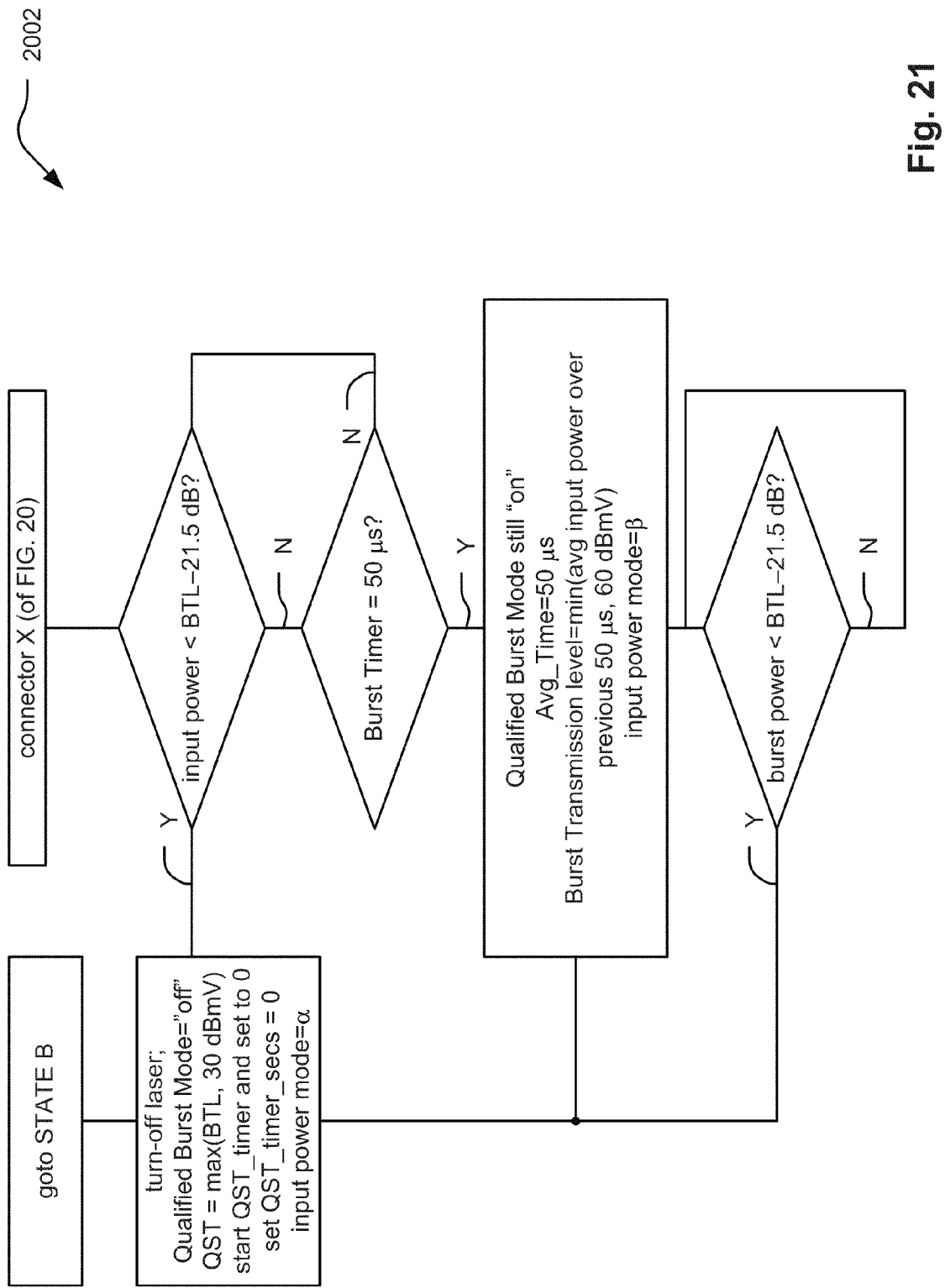

Particularly, FIG. 20 and FIG. 21, considered together, illustrate an embodiment of a method for performing signal detection in accordance with optical transmitters.

Figure 22:
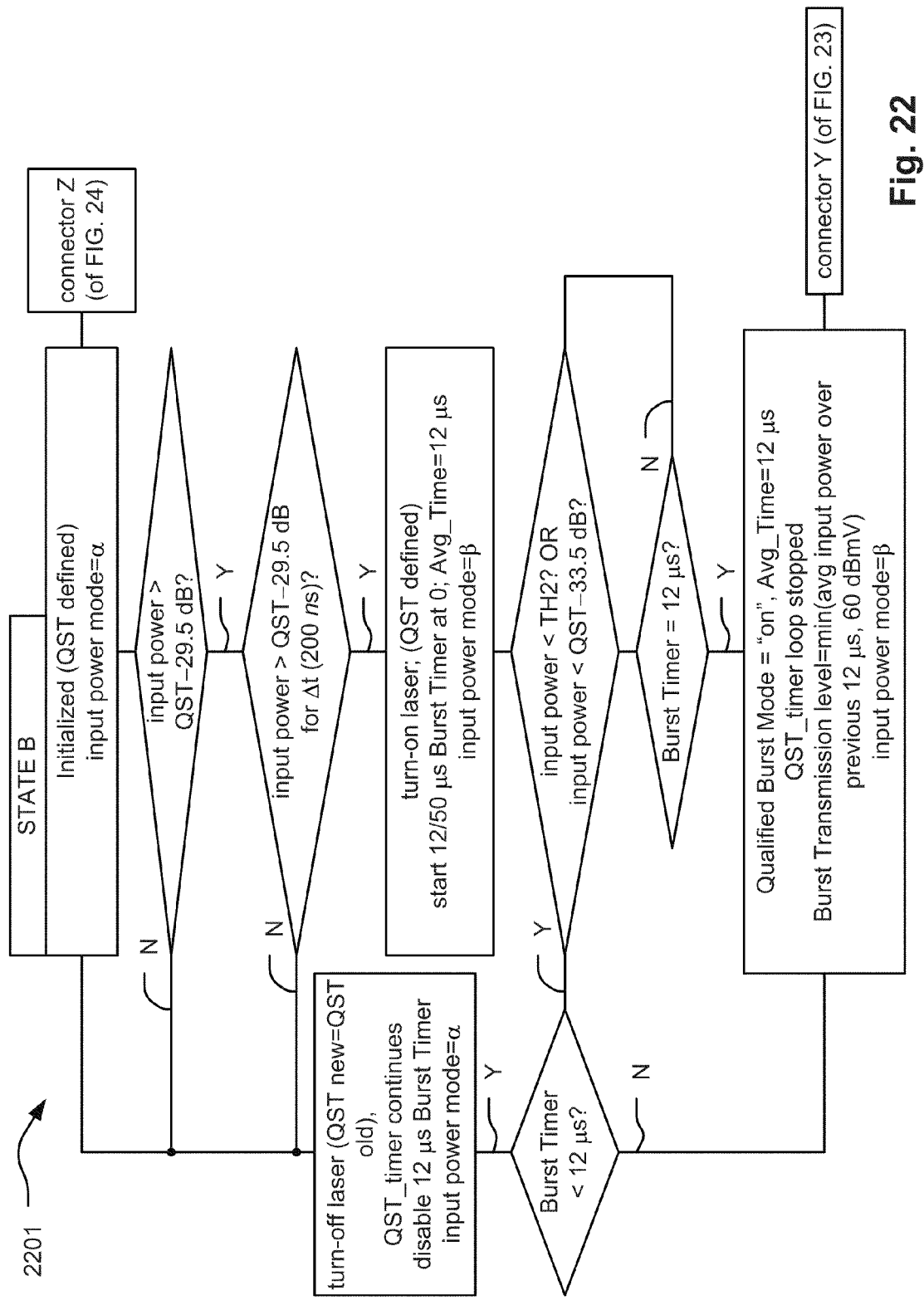
Figure 23:
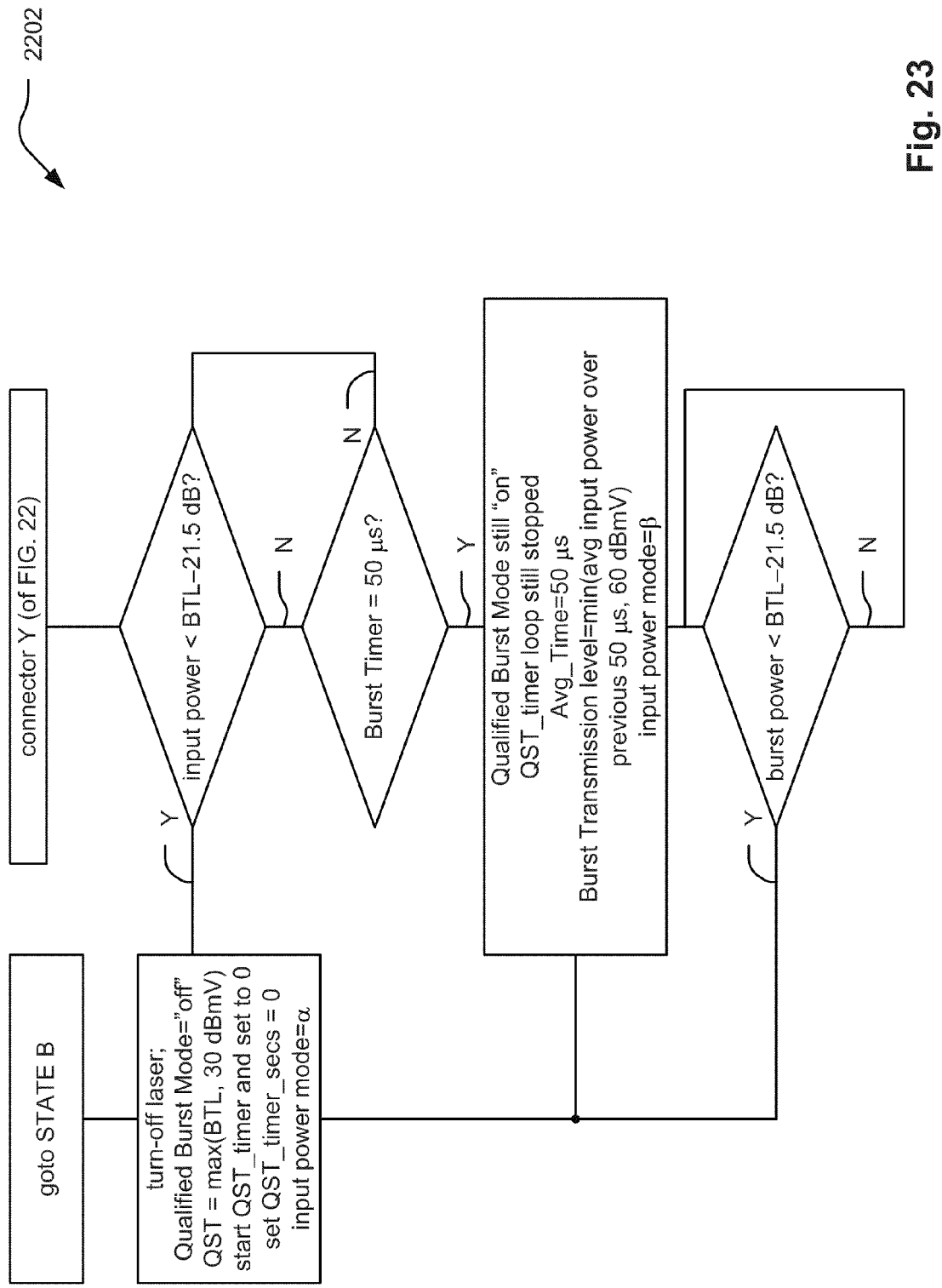
Figure 24:
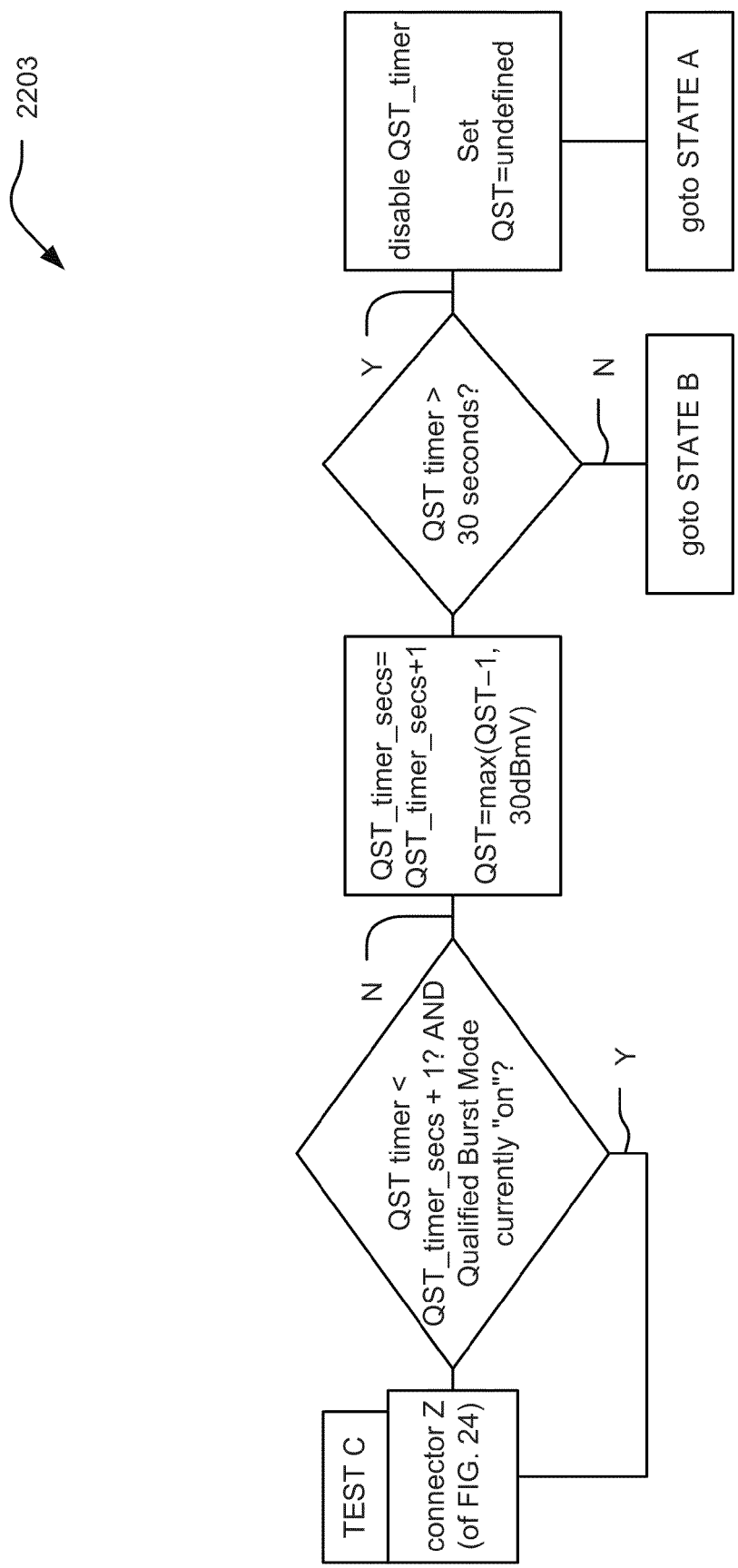

Particularly, FIG. 22, FIG. 23, and FIG. 24, considered together, illustrate an alternative embodiment of a method for performing signal detection in accordance with optical transmitters, including adaptive threshold for turn-on.

DETAILED DESCRIPTION OF THE INVENTION

A novel means for enabling better usage of optical links in communication systems and networks where electrical signals (e.g., radio frequency (RF) signals) are converted to optical signals, modulated onto optical carriers and launched into an optical communication medium (e.g., optical fiber), and multiple such optical fiber communication links may then be combined into a single optical fiber that is connected to a single, shared optical communication receiver.

Economic advantages exist in certain embodiment scenarios for combining such optical links, and time-sharing them via an appropriate scheduling means, rather than providing the combining of RF signals prior to a single dedicated optical transmitter/receiver pair, or using multiple dedicated optical transmitter/receiver pairs with their own dedicated fiber connection. One example of the application of such combined optical links is the insertion of such communication links into modified hybrid fiber coax (HFC) cable plants. Herein, upstream RF signals from one or more communication devices (e.g., cable modems) may be combined into an economical optical transmitter for modulation onto the optical carrier, and within the communication network segment, multiple such optical transmitters are deployed. Moreover, multiple optical fiber communication links are then combined in the upstream direction, and these typically feed to a single optical receiver. In the art, this architecture has been termed RF over Glass, or RFoG.

This architecture differs from traditional HFC cable plants. In the traditional HFC plants, the upstream optical transmitter is always on, and it modulates the light transmitted there-from based on the RF input signal received at its input. The optical transmitter is connected to its paired optical receiver, which converts the light modulation back into the RF signal which was originally input to its paired optical transmitter (with some degradation undoubtedly). In the RF over Glass (RFoG) architecture, multiple optical transmitters are combined such that they are then transmitted to one optical communication receiver. Various interference mechanisms can occur to degrade performance when multiple optical transmitters are "on" simultaneously, and thus the corresponding network scheduler will generally attempt to grant upstream access to cable modems and other upstream transmitting communication devices (e.g., RF transmission devices) which are implemented "behind" only one optical transmitter at a time. It is part of the functional requirements of an optical transmitter in this RFoG network to detect the presence of an electrical (e.g., RF) signal at its input and activate (or turn on) the optical transmission and modulation there from based on that electrical (e.g., RF) signal, and to similarly detect and turn off or deactivate the optical transmission and mode when the electrical (e.g., RF) signal is no longer present at its input.

Regarding RFoG networks, preliminary draft specifications have been generated (e.g., January 2009, within SCTE Study Group 5) which show a block diagram of an optical transmitter, which includes only two functional blocks therein: signal detection and laser (or optical transmitter). The requirements for the Signal Detection in the reference indicates that the optical transmitter should be activated when the RF input power is above a threshold, and should be deactivated when the RF input power is below a threshold. However, this mere on/off operational means of operating such an optical transmitter, based only on the RF input power being above or below the threshold, is very inadequate and deficient to deal with the many operational considerations of the actual communication system.

It is important to activate the optical transmission in time to transmit the RF upstream burst transmission in its entirety, or to transmit the RF upstream burst transmission within a degree which is practical within the constraints of the overall architecture and goals of economy. Obviously failing to relay some of the upstream signal either degrades the communication message or means that unnecessary signaling was inserted, which means the signaling introduced inefficiency. By simply observing the RF input, it is obviously impossible, without delay devices, to detect the signal in a sufficiently short amount of time to turn it on in its entirety, due to causality. However, detecting the signal as early as possible, in an economically feasible manner, is nonetheless the primary goal. It is also desired to keep the optical transmitters from transmitting unnecessarily, such as when no communication-bearing RF signal is present at their input. A complication is that a major impairment in such cable upstream systems is impulse or burst noise, and it should be a goal to minimize the erroneous optical transmission triggered by such RF impulse and burst noise. Another impairment in cable upstream systems is ingress noise, which is often described as narrowband ingress noise, but multiple distinct narrowband ingress signals may exist, and often they fluctuate in power, even completely shutting off for a time. Another complication is that one of the major signal formats that is intended for the system is Data Over Cable Service Interface Specification (DOCSIS) [the major standard used by U.S. cable systems in providing Internet access to users] upstream burst transmission. The symbol shaping filtering of the DOCSIS formats, the possible high density modulation they may carry, and the multiplicity of symbol rates within the DOCSIS upstream formats, all present complications to making a satisfactory economical signal detection mechanism. Further, there are multiple carrier frequencies, and one or more channels may be operational at one time, and they may begin operation nearly simultaneously and may cease operation nearly simultaneously.

Herein, a much improved means by which signal detection may be performed within communication systems that perform electrical to optical conversion (e.g., such as within communication systems operating in accordance with the RFoG optical transmitters). By simply activating and deactivating an optical transmitter (e.g., a light source such as an LD or LED) based solely on a threshold power level can result in unnecessarily poor performance for the devices within the networks. Demodulation of the upstream input to determine the presence of the signals which should activate the laser is unduly complicated and time-consuming.

However, the novel and multi-faceted means of performing turn on and turn off of such an optical transmitter, that involves considering multiple parameters, provides for much improved performance. In particular, considering one application context, the nature of the DOCSIS upstream bursts is such that the currently expressed approach (standard art) for signal detection, that is based solely on a threshold power level, will operate poorly with such signals, no matter what thresholds are chosen therein.

In contrast, signal detection in accordance with the means presented herein operates based on energy (e.g., by integrating an input power level over a period of time), which is power averaged over a period of time, and not merely power level for the RFoG signal detection operation. Further, the signal detection averaging time results should be operable to eliminate a strong noise burst, even of short duration, from tripping the detection. A much improved means for making the turn-on decision provides for a plurality (two or more) of average power results to be processed, with the "window" of time used for computing the different averages being substantially different, although with a plurality of average power results arising from different "windows" of time, some of the "windows" may not be substantially different from others of the "windows".

The averaging of power of the electrical signal in one embodiment is performed over a time window that has a finite duration impulse response. For example, the averaging window may be viewed as being performed over a fixed window (e.g., a time window of fixed length/duration). Also, consequently, the time window has a finite memory. By employing such a finite window, the determined energy (as opposed to merely measuring the instantaneous power, voltage level, etc.) of the electrical signal will effectively be performed in accordance with averaging filtering that has a finite duration impulse response. One option for implementing such functionality is to perform such averaging in the digital domain such as in a digital signal processor (DSP) or equivalent type component(s) (e.g., after the electrical signal having passed through an analog to digital converter (ADC)), so that there is no substantial analog component filtering (e.g., such analog filtering means oftentimes include one or more resistors, capacitors, and/or inductors and consequently, and can have a correspondingly infinite impulse response).

Moreover, alternative embodiments and aspects for performing more robust signal detection include:

a. Using learning to adjust the signal detection thresholds. Previously detected levels of signaling bursts would raise the threshold levels from a minimum value. The length of a signaling burst would factor into raising of the threshold in some embodiments to minimize falsely raising threshold. Stepping a threshold to a higher level for subsequent strong signaling bursts adds robustness, avoiding bumping thresholds high erroneously. Threshold level would reduce over time if subsequent signal bursts are not detected.

b. Signaling the signal detection circuitry via means other than the RF input.

c. Incorporating delay mechanism in the RF path, such as analog to digital conversion (ADC), delay line, digital to analog conversion (DAC), to simulate a non-causal signal detection approach. The signal path is delayed relative to the path used for detection.

d. Using learning to adjust the turn-off signal detection threshold for a single burst. This may be simpler than adjusting the turn-on threshold for future bursts but provides benefit in making the turn-off decision more reliable than just absolute thresholds.

e. Use symbol rate of signals to adjust averaging times. Detect symbol rate of bursts, and combine with the above techniques, but vary averaging time (in addition to or in lieu of threshold levels).

f. Use ingress cancellation techniques to learn and cancel ingress, in order to mitigate ingress from causing unintended turn on.

DOCSIS upstream bursts, with their symbol shaping, have envelope characteristics (distribution, autocorrelation) which can be used to detect their presence and absence, and start-up and ending of transmissions, and identifying metrics are not difficult to generate. For example, the envelope will have more variation at mid-symbol than at symbol centers. This type of variation can be more distinct during ramp-up and ramp-down of a burst, and can be used to detect the signal presence as well as the symbol rate. Detection profiles for all the DOCSIS symbol rates, and other intended signals, can be tuned for early detection of the signals with the particular characteristics they contain. More generic detection for more general signals could still apply, but superior detection performance would be provided for signals with "tuned" detection profiles.

Figure 1:
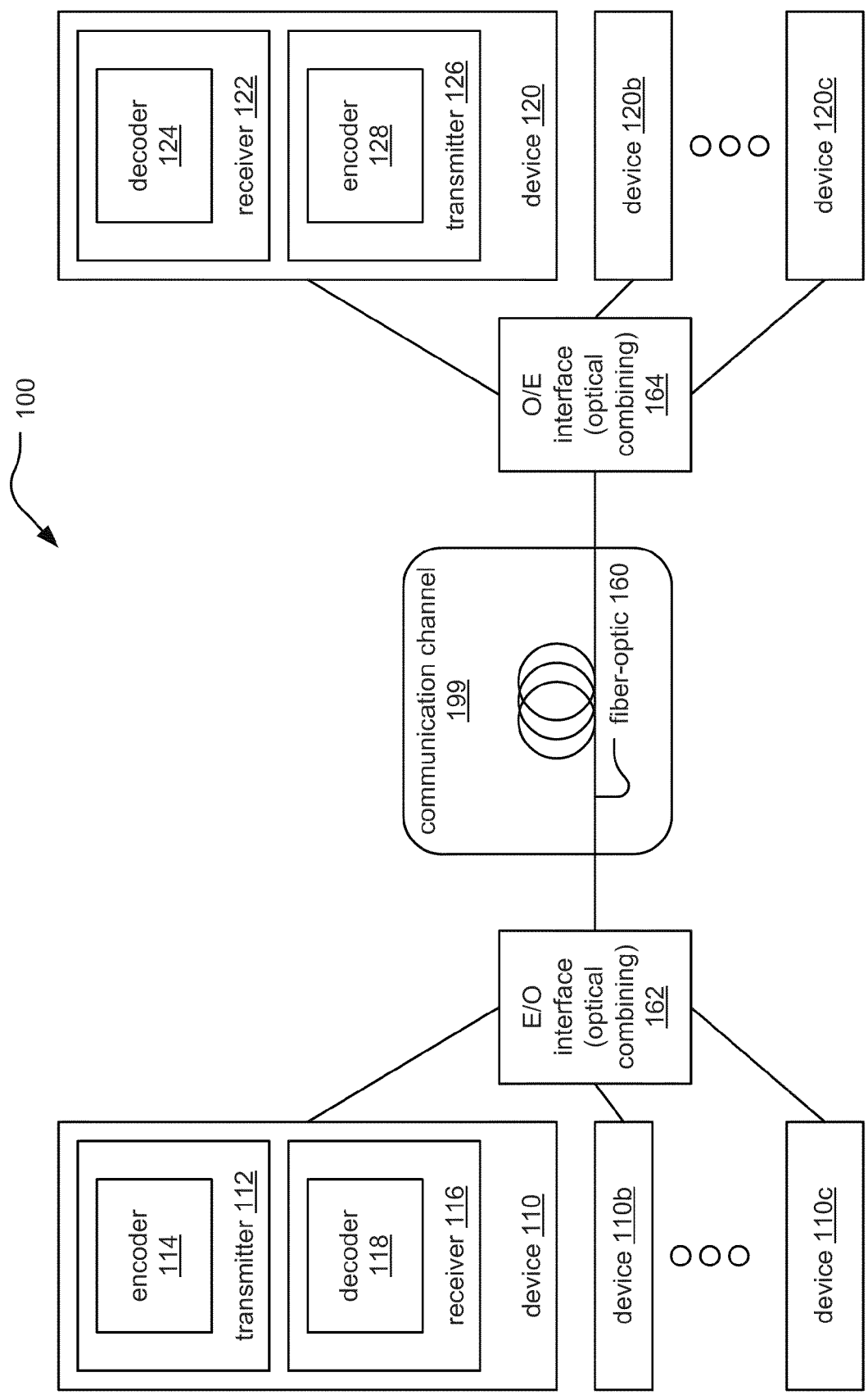
FIG. 1 and FIG. 2 illustrate various embodiments of communication systems.

One goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and/or other types of media (or combinations thereof) as well.

Figure 2:
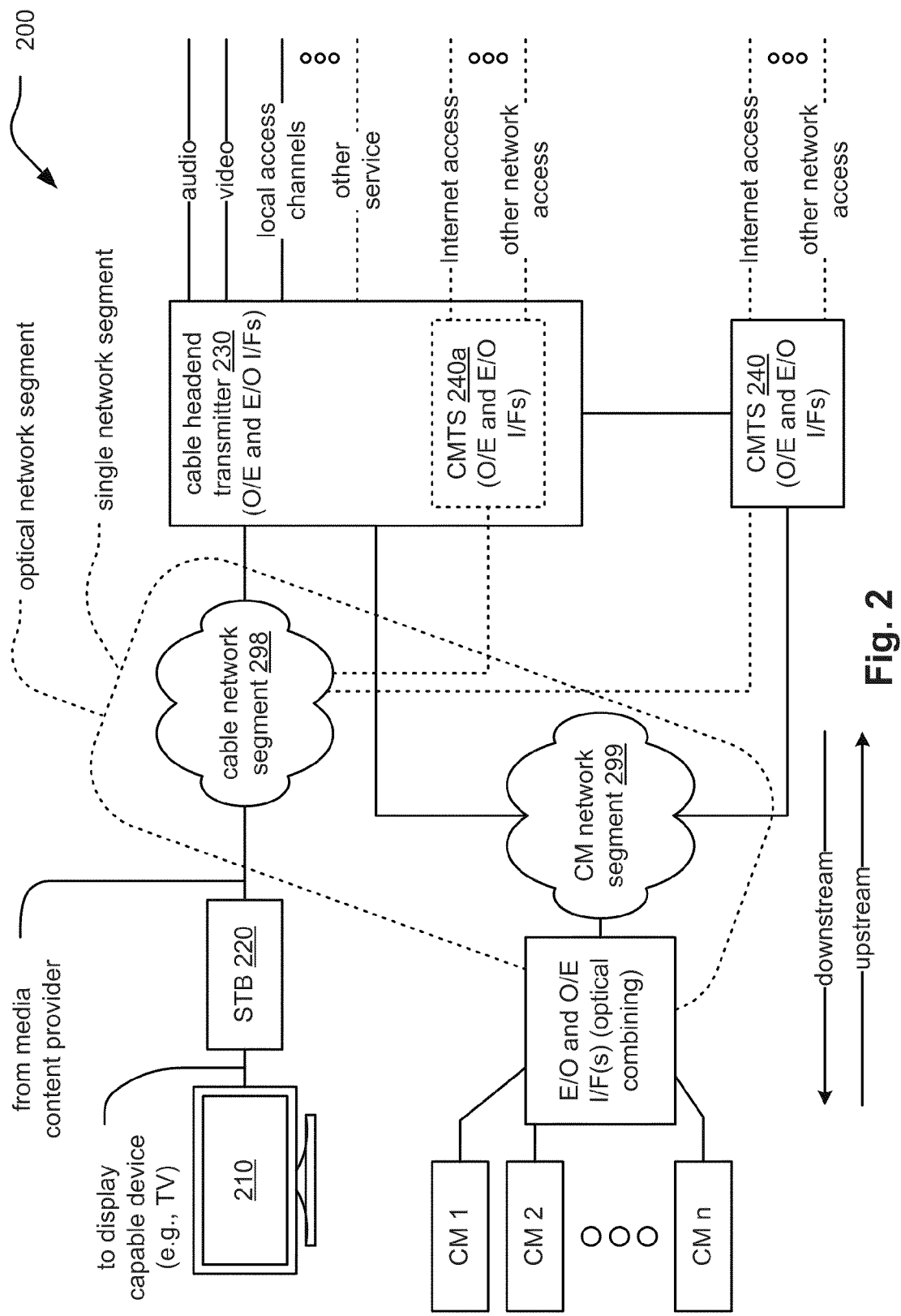

FIG. 1 and FIG. 2 are diagrams which illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver.

There are several different types of media by which the communication channel 199 may be implemented (e.g., a wireless communication channel various antennae, a wired communication channel, and/or a fiber-optic communication channel 160 using electrical to optical (E/O) interface 162 and optical to electrical (O/E) interface 164)). The various embodiments presented herein reside in the context of optical communication systems (that includes at least some optical components and communication links therein). In addition, more than one type of media may be implemented and interfaced together thereby forming the communication channel 199.

Moreover, multiple communication devices (e.g., such as communication device 110, communication device 110*b*, and up to communication device 110*c*) may communicate with and be coupled to the E/O interface 162. Also, at the other end of the communication channel 199, multiple communication devices (e.g., such as communication device 120, communication device 120*b*, and up to communication device 120*c*) may communicate with and be coupled to the O/E interface 164. Also, in some embodiments, more than one electrical signal is provided to the interface modules 162 and 164, and combining of the electrical signals or optical signals generated there from may be performed therein as well without departing from the scope and spirit of the invention.

To reduce transmission errors that may undesirably be incurred within a communication system, error correction and channel coding schemes are often employed. Generally, these error correction and channel coding schemes involve the use of an encoder at the transmitter and a decoder at the receiver.

It is noted that while this embodiment of communication system 100 includes communication devices 110 (and 110*b*, and up to 110*c*) and 120 (and 120*b*, and up to 120*c*) that include both transmitter and receiver functionality, clearly, communication device 110 could include only transmitter functionality and communication device 120 could include only receiver functionality, or vice versa, to support unidirectional communication (vs. bi-directional communication) in alternative embodiments.

Any of a variety of types of coded signals (e.g., turbo coded signals, turbo trellis coded modulation (TTCM) coded signal, LDPC (Low Density Parity Check) coded signals, Reed-Solomon (RS) coded signal, and/or any combination of such coded signals, etc.) can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Moreover, various types of signaling (e.g., orthogonal frequency division multiplexing (OFDM), code division multiple access (CDMA), synchronous code division multiple access (S-CDMA), time division multiple access (TDMA), etc.) may be implemented herein to allow more than one user to have access to the communication system. Such signaling schemes may generally be referred to as multiple access signaling schemes, and any one or more of these signaling schemes may be performed within such embodiments.

Referring to the communication system 200 of FIG. 2, this communication system 200 may be viewed particularly as being a cable system. For example, the communication system 200 includes a number of cable modems (shown as CM 1, CM 2, and up to CM n). One or more electrical to optical interfaces operate to convert electrical signals provided from the various cable modems to one or more optical signals to be transmitted via a cable modem network segment 299, that itself is implemented using one or more optical communication links therein. The cable modem network segment 299 couples the cable modems to a cable modem termination system (CMTS) (shown as 240 or 240*a* and as described below).

A CMTS 240 or 240*a* is a component that exchanges digital signals with cable modems on the cable modem network segment 299. Each of the cable modems coupled to the cable modem network segment 299, and a number of elements may be included within the cable modem network segment 299. For example, routers, splitters, couplers, relays, filter, and amplifiers may be contained within the cable modem network segment 299.

The cable modem network segment 299 allows communicative coupling between a cable modem (e.g., a user) and the cable headend transmitter 230 and/or CMTS 240 or 240*a*. Again, in some embodiments, a CMTS 240*a* is in fact contained within a cable headend transmitter 230. In other embodiments, the CMTS is located externally with respect to the cable headend transmitter 230 (e.g., as shown by CMTS 240). For example, the CMTS 240 may be located externally to the cable headend transmitter 230. In alternative embodiments, a CMTS 240a may be located within the cable headend transmitter 230. The CMTS 240 or 240a may be located at a local office of a cable television company or at another location within a cable system. In the following description, a CMTS 240 is used for illustration; yet, the same functionality and capability as described for the CMTS 240 may equally apply to embodiments that alternatively employ the CMTS 240a. The cable headend transmitter 230 is able to provide a number of services including those of audio, video, local access channels, as well as any other service of cable systems. Each of these services may be provided to the one or more cable modems (e.g., CM 1, CM2, etc.). In addition, it is noted that the cable headend transmitter 230 may provide any of these various cable services via cable network segment 298 to a set top box (STB) 220, which itself may be coupled to a television 210 (or other video or audio output device). While the STB 220 receives information/services from the cable headend transmitter 230, the STB 220 functionality may also support bi-directional communication, in that, the STB 220 may independently (or in response to a user's request) communicate back to the cable headend transmitter 230 and/or further upstream.

In addition, through the CMTS 240, the cable modems are able to transmit and receive data from the Internet and/or any other network (e.g., a wide area network (WAN), internal network, etc.) to which the CMTS 240 is communicatively coupled. The operation of a CMTS, at the cable-provider's head-end, may be viewed as providing analogous functions provided by a digital subscriber line access multiplexor (DSLAM) within a digital subscriber line (DSL) system. The CMTS 240 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 299, decides whether a particular block of data is intended for it or not. On the upstream side, information is sent from the cable modems to the CMTS 240; on this upstream transmission, the users within the group of cable modems to whom the data is not intended do not see that data at all.

As an example of the capabilities provided by a CMTS as implemented in a wired communication system context, a CMTS will enable as many as 1,000 users to connect to the Internet through a single 6 Mega-Hertz (MHz) channel. Since a single channel is capable of 30-40 Mega-bits per second (Mbps) of total throughput (e.g., currently in the DOCSIS standard, but with higher rates envisioned such as those sought after in accordance with the developing DVB-C2 (Digital Video Broadcasting-Second Generation Cable) standard, DVB-T2 (Digital Video Broadcasting-Second Generation Terrestrial) standard, etc.), this means that users may see far better performance than is available with standard dial-up modems. However, it is noted that the capabilities (e.g., in terms of Mbps) of such communication systems including optical components and communication links therein are typically even greater.

Moreover, it is noted that the cable network segment 298 and the cable modem network segment 299 may actually be the very same network segment in certain embodiments. In other words, the cable network segment 298 and the cable modem network segment 299 need not be two separate network segments, but they may simply be one single network segment that provides connectivity to both STBs and/or cable modems. In addition, the CMTS 240 or 240a may also be coupled to the cable network segment 298, as the STB 220 may itself include cable modem functionality therein.

Figure 3:
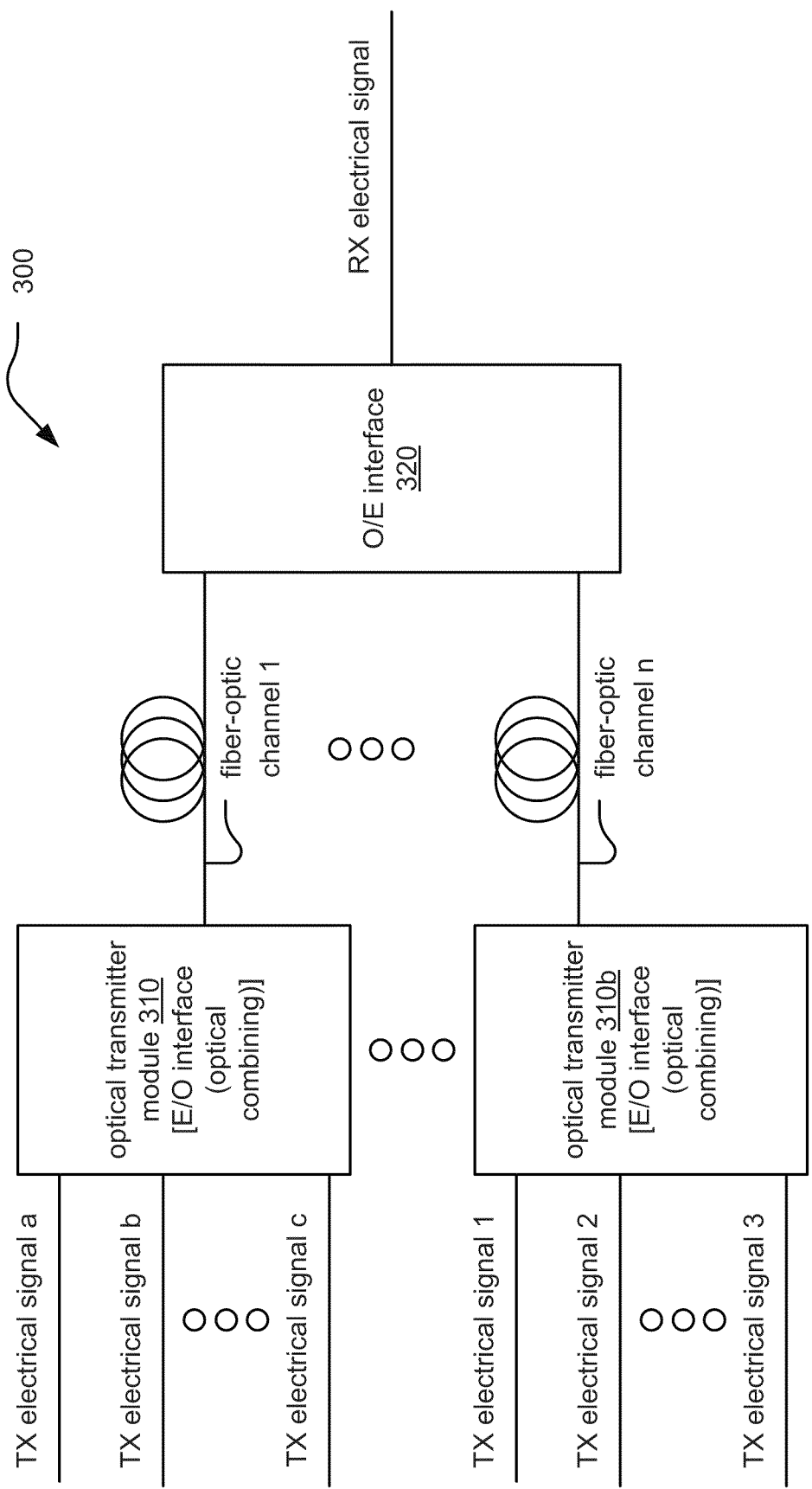
FIG. 3 illustrates an embodiment of a communication system including more than one communication device that communicates over a common optical communication link.

FIG. 3 illustrates an embodiment of a communication system 300 including more than one communication device that communicates over a common optical communication link. Multiple electrical signals (e.g., transmit (TX) electrical signal a, TX electrical signal b, and up to electrical signal c) are provided to an optical transmitter module 310. An optical signal is output there from via a fiber-optic channel 1 to an optical to electrical interface 320.

Also, in some embodiments, multiple electrical signals (e.g., TX electrical signal 1, TX electrical signal 2, and up to electrical signal 3) are provided to an optical transmitter module 310b. An optical signal is output there from via a fiber-optic channel 2 to the optical to electrical interface 320. This communication system 300 shows an embodiment where multiple electrical signals are provided to an optical transmitter and a single optical signal is output there from, and this communication system 300 also shows how multiple optical signals, via more than one optical communication link, are provided to a common optical to electrical interface 320.

The novel approach to effectuating turn-on and turn-off, in accordance with the various principles and aspects presented herein, includes employing a revised requirement for signal level threshold for transmitter turn-on.

In some embodiments, in accordance with the turn-on profile, there may be three "points" specified therein. Also, in accordance with the turn-off profile, there may be two "points" specified therein. The turn-off may be specified relative to the signal level during burst. Also, the turn-on may be specified relative to the previous burst signal levels after initial burst (or based upon long absence of bursts, the time duration of which may be predetermined or adaptive). Certain specifications of transmit power stability during transmission and transmit power characteristics during "OFF" state may be specified (e.g., again, either using one or more predetermined values or those adaptively determined [and/or modified/adapted as a function of time, operating conditions, signal history, etc.]). Many of the specifications provided herein are directed to embodiments employing continuous wave (CW) radio frequency (RF) carrier input (turned on and off), but such principles may of course be adapted for specification and testing with actual signaling waveforms.

Certain of the embodiments and associated requirements presented herein may be specifically tailored to address performance needed for DOCSIS with consideration of return out of band (OOB) per the Society of Cable Communications Engineers (SCTE) standards 55-1 and 55-2. Of course, it is noted that other legacy equipment may exist within such communication systems and could also be used on an RFoG system (e.g., circuit-switched voice over cable). Proposed requirements address DOCSIS 1.x, 2.0, and 3.0 operation, but it is reasonable to expect that RFoG systems will operate with DOCSIS 2.0 and later. Within such communication systems, the highest upstream symbol rates and highest density constellations are expected to be possible in many RFoG deployments. In some instances, it may be appropriate to assume that only QPSK will be used for symbol rates <1 MHz. The DOCSIS configurable guardtime parameter(s) can possibly provide some allowance in some aspects of turn-on/turn-off requirements. Some embodiments may use only quadrature phase shift keying (QPSK) modulation for symbol rates <1.28 MHz, and alternative embodiments may maintain SCTE 55-1 and 55-2 signal levels within −5 dBc to 0 dBc of DOCSIS signal levels (e.g., providing much higher energy per symbol).

Figure 4:
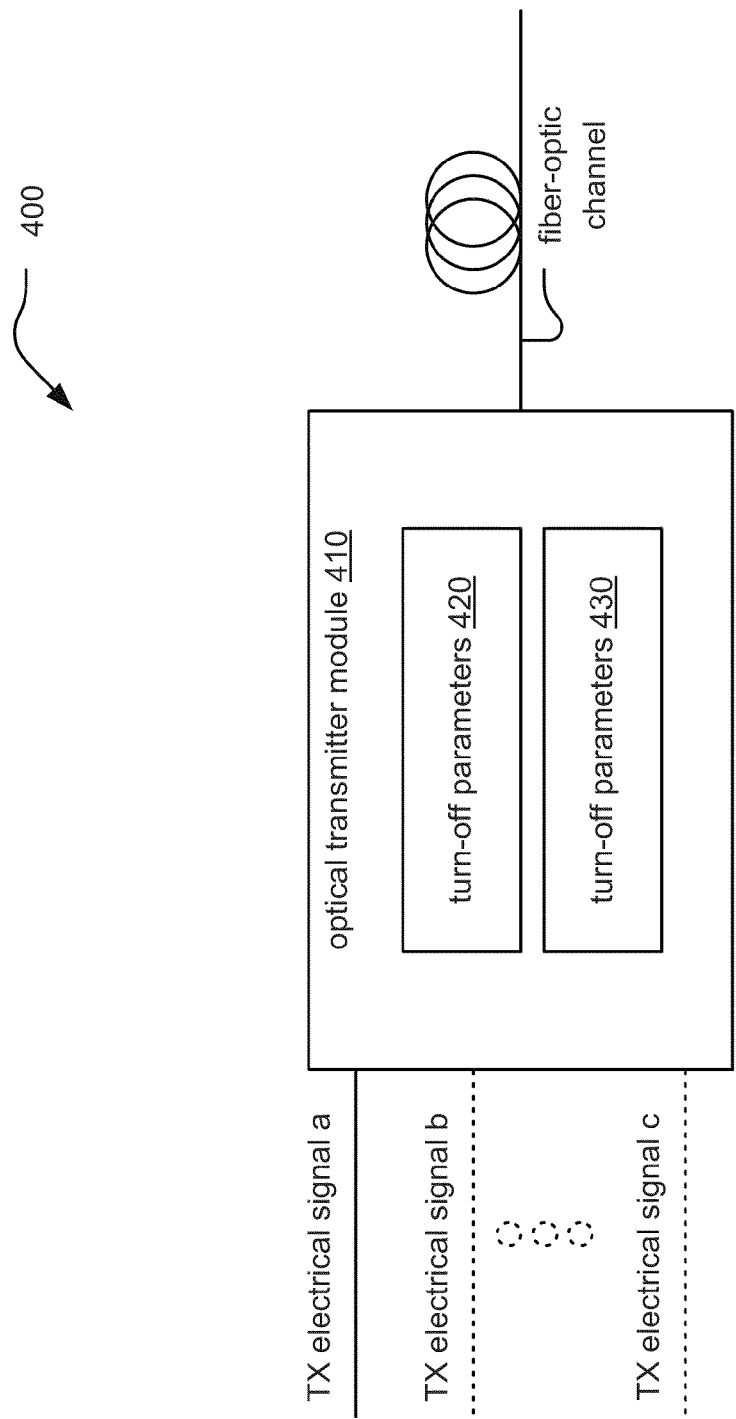
FIG. 4 illustrates an embodiment of a communication system including a device that performs electrical to optical conversion of signals.

FIG. 4 illustrates an embodiment of a communication system 400 including a device that performs electrical to optical conversion of signals. One or more electrical signals (e.g., TX electrical signal a, and possibly also TX electrical signal b, and up to electrical signal c) are provided to an optical transmitter module 410. A number of turn-on parameters 420 and a number of turn-off parameters 430 operate to govern the manner by which the optical transmitter module 410 turns on and turns off for transmitting light via an optical communication system.

The novel means presented herein provide for a revised requirement for signal level threshold for transmitter turn-on. Also, in certain embodiments, three separate "points" are employed in the turn-on profile, and two "points" are employed in the turn-off profile. The framework proposed herein also includes specifying transmit power stability during transmission in "steady state", and specifying transmit power characteristics during "OFF" state. This operates beyond merely assuming a continuous wave (CW) carrier electrical signal (e.g., radio frequency (RF)) input.

In addition, the novel means for managing optical transmitter turn on and turn off may be implemented to meet the requirements of DOCSIS, and also for return OOB for SCTE 55-1 and SCTE 55-2.

Also, it is expected that turn on/turn off requirements needed for DOCSIS will be sufficient for a STB return as well (such as in a cable communication system). Also, other legacy equipment exists in such communication systems, and these still could be used on an RFoG system (e.g., circuit-switched voice over cable).

Proposed requirements address DOCSIS 1.x, 2.0, and 3.0 operation, but it is also reasonable to expect that RFoG systems will operate with DOCSIS 2.0 and later versions thereof as well. The use of higher (or highest) upstream symbol rate and higher (or highest) density constellation are expected to be possible in many RFoG deployments. The DOCSIS guardtime parameter can possibly provide some relaxation in some aspects of turn-on/turn-off requirements.

Figure 5:
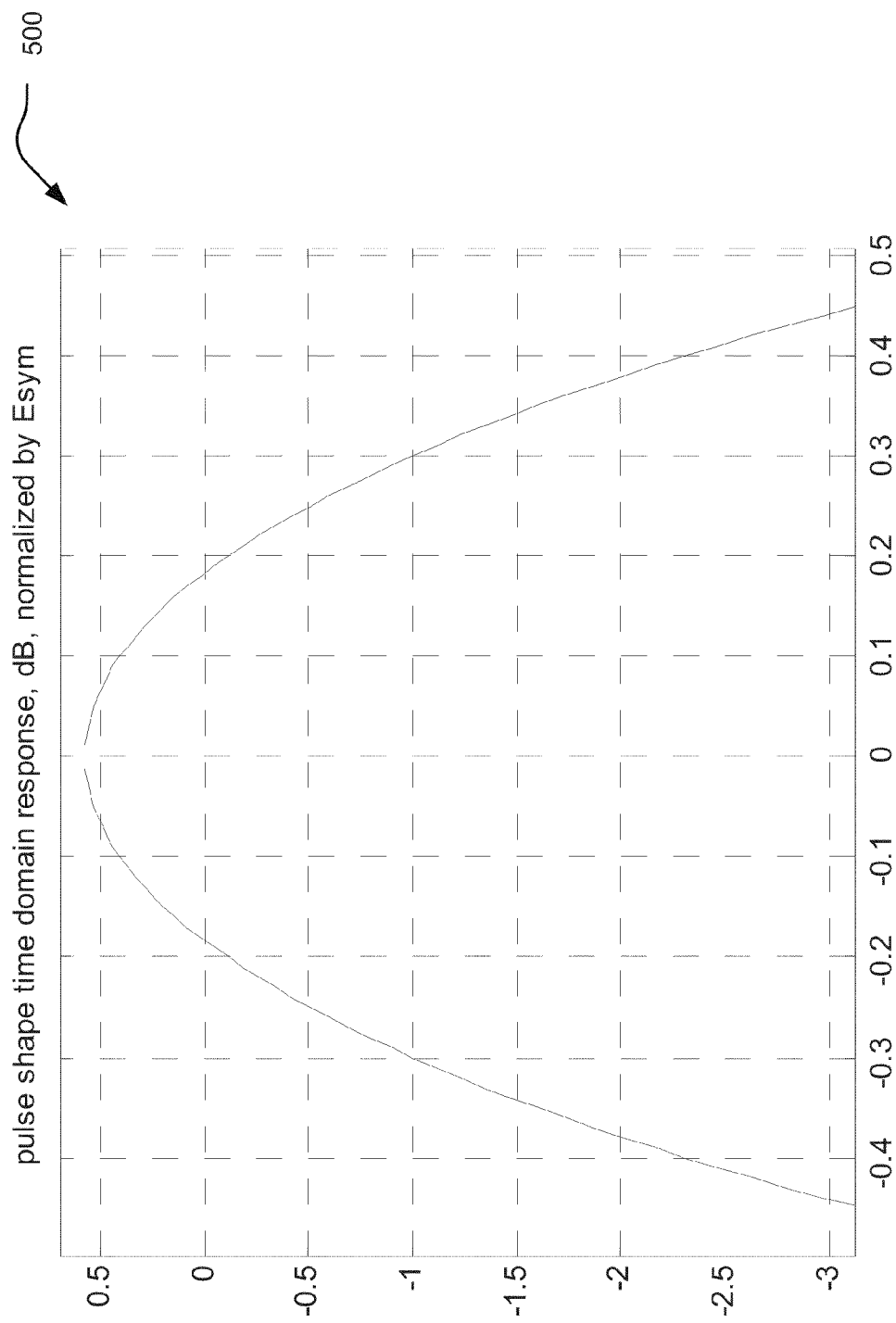
FIG. 5 illustrates an embodiment of symbol shaping of DOCSIS upstream transmissions (pulse shape time domain response, dB, normalized by symbol energy (Esys)).

FIG. 5 illustrates an embodiment 500 of symbol shaping of DOCSIS upstream transmissions (pulse shape time domain response, dB, normalized by symbol energy (Esys)). Many symbol durations of the time domain shaping of ONE symbol "pulse" are depicted. In this diagram, 30 symbol durations of the symbol voltage are shown versus time are depicted.

Figure 6:
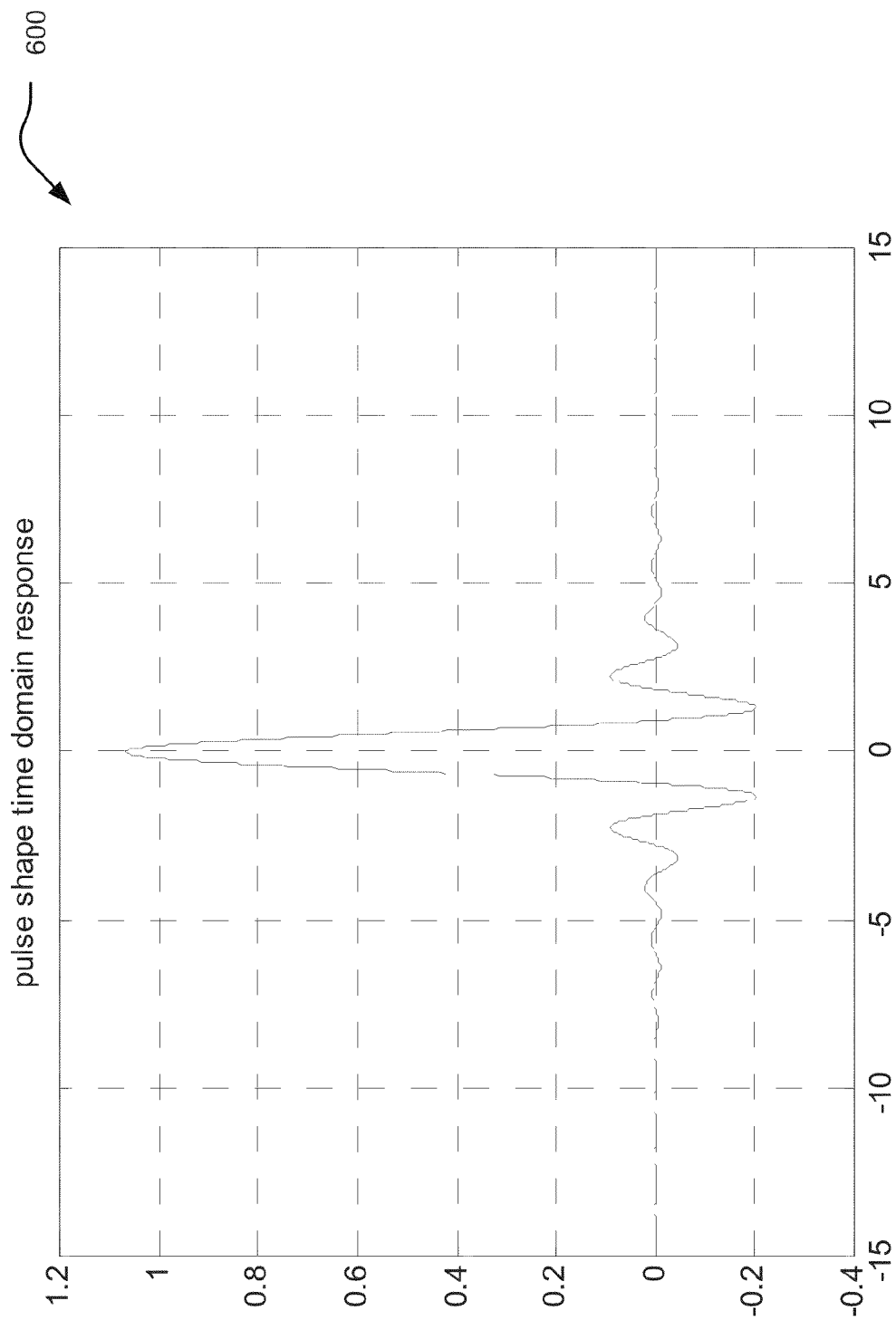
FIG. 6 illustrates an embodiment of symbol shaping of DOCSIS upstream transmissions (pulse shape time domain response).

FIG. 6 illustrates an embodiment of symbol shaping of DOCSIS upstream transmissions (pulse shape time domain response). In this diagram, 10 symbol durations of the symbol power are shown versus time in log scale (dB). The symbol rate and average symbol power are normalized (unity for both).

Figure 7:
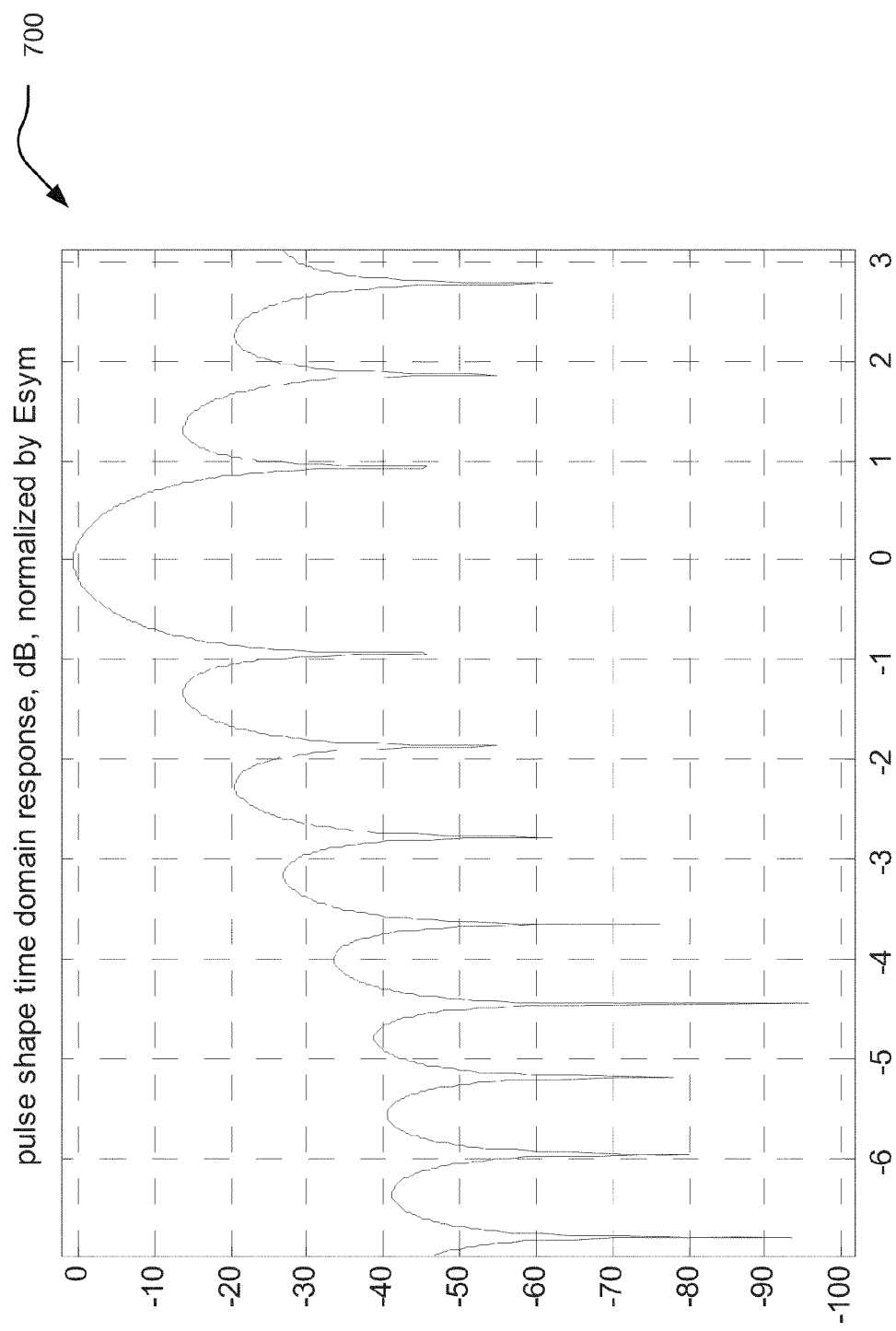
FIG. 7 illustrates an alternative embodiment of symbol shaping of DOCSIS upstream transmissions (pulse shape time domain response, dB, normalized by symbol energy (Esys)).

FIG. 7 illustrates an alternative embodiment of symbol shaping of DOCSIS upstream transmissions (pulse shape time domain response, dB, normalized by symbol energy (Esys)).

Figure 8:
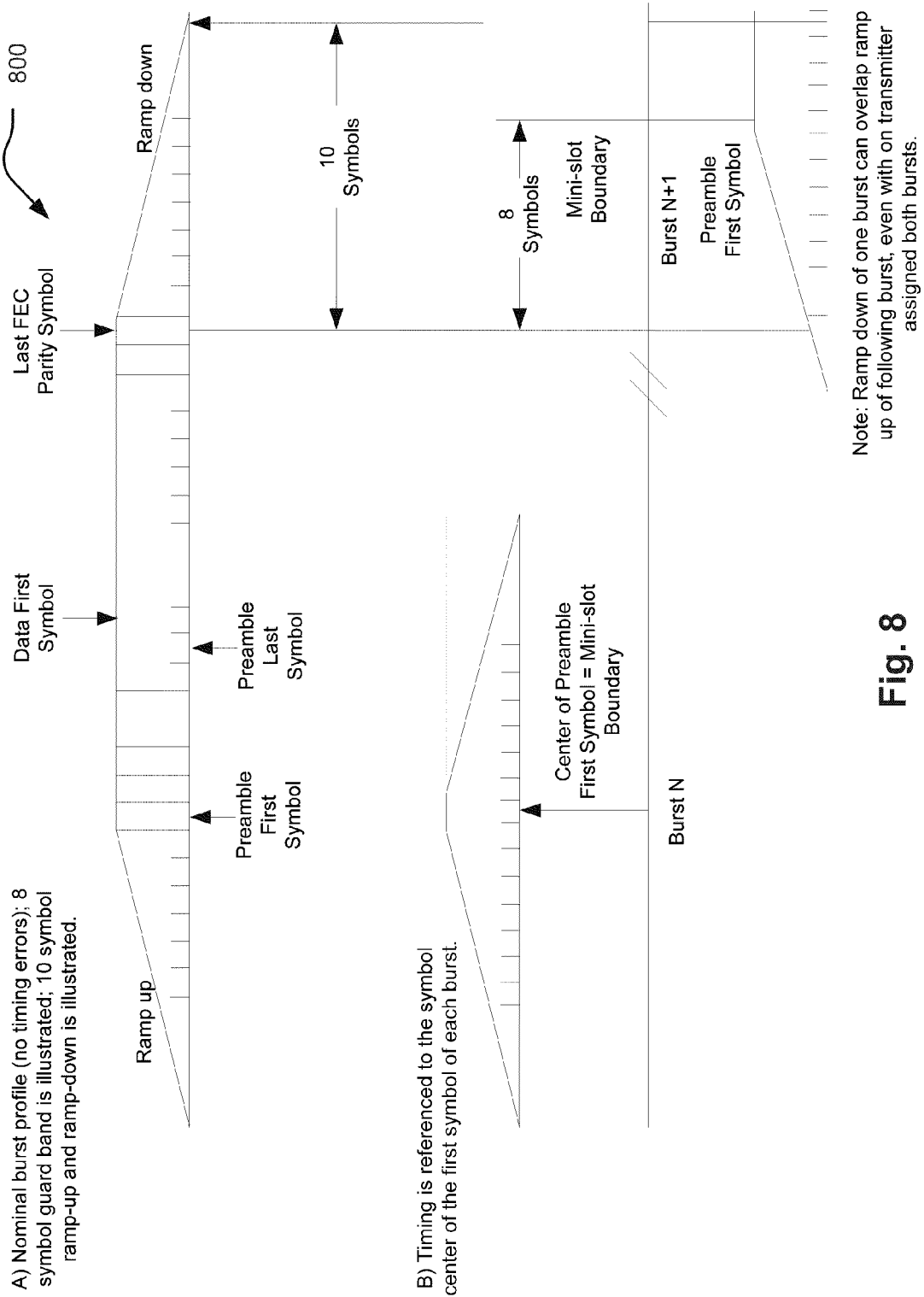
FIG. 8 illustrates an embodiment of the DOCSIS specification ramp up and ramp down time.

FIG. 8 illustrates an embodiment 800 of the DOCSIS specification ramp up and ramp down time. This diagram refers to the "time domain side-lobes" of the symbol shaping (shown in FIG. 6 and FIG. 7). It is noted that while the ramp up and ramp down envelope as linear voltage versus time, the ramp up and ramp down are more "linear" in the log scale depiction of symbol shaping.

Figure 9:
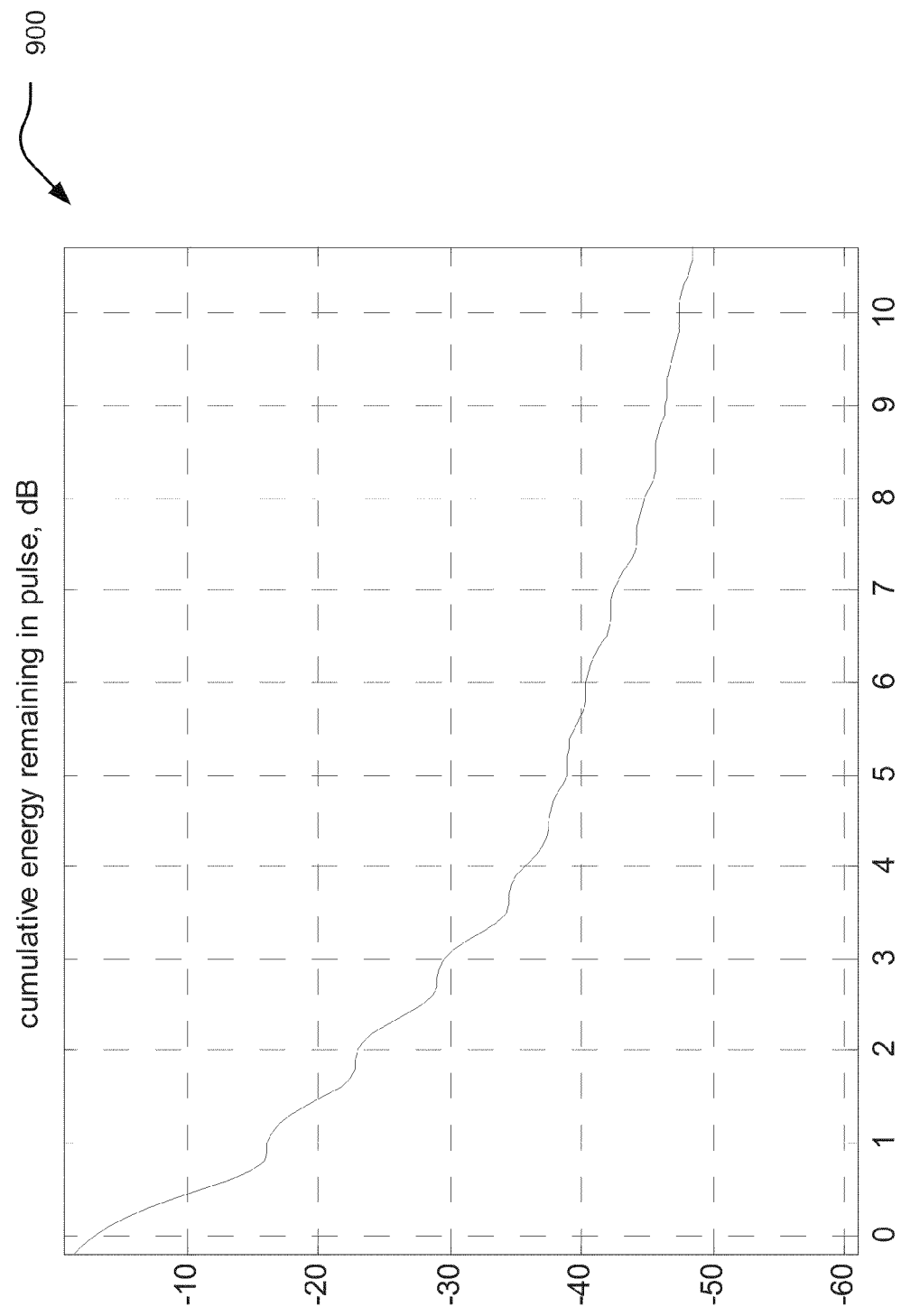
FIG. 9 illustrates an embodiment of cumulative energy in the remaining tail of a single DOCSIS symbol pulse.

FIG. 9 illustrates an embodiment 900 of cumulative energy in the remaining tail of a single DOCSIS symbol pulse. The symbol rate and average symbol power are normalized (unity for both, i.e. 0 dBc for symbol power). At the symbol center, t=0, −3 dB or half power is remaining in the tail. After symbol center, 1% or −20 dBc of symbol energy remains 1.5 symbol durations. After symbol center, 0.1% or −30 dBc symbol energy remains 3 symbol durations. 99.8% of symbol energy is contained in (or spread over) 6 symbol durations. 10% or −10 dBc symbol energy remains after 0.5 symbol durations from the symbol center. 80% of symbol energy is contained in one symbol duration centered from symbol center.

In the prior art approach (e.g., RONU R-optical network unit (ONU) functional block diagram) for performing turning on and turning off of an optical transmitter, there are typically only two functional blocks employed: signal detection circuit and optical transmitter. Signal detection circuit senses "above threshold" RONU RF input power and signals optical transmitter to "turn-on". The optical transmitter reacts to "turn-on" signal by increasing optical transmit power and approaching steady-state ON fidelity.

In contrast to the prior art approaches, there are three "turn-on" epochs after RONU RF input is "above threshold":

a. Turn on epoch 1: "Above threshold" RF input signal detected and optical transmitter commanded to "turn-on"

b. Turn on epoch 2: Average optical transmit power reaches 90% (in one embodiment) of steady-state average optical transmit power c. Turn on epoch 3: Optical transmitter reaches steady-state fidelity An adaptable turn-on threshold may be employed for a number of reasons. This will incur a relatively small additional complexity given an adaptable turn-off threshold being implemented therewith. Such an adaptively determined turn-on threshold may be employed to deal with the large dynamic range of input signals. Being adaptively determined, the turn-on threshold may be defined as relative, versus absolute, threshold levels leveraged for enhanced performance. Overall, this may provide for an improvement in efficiency and performance for the most utilized DOCSIS signal bursts.

It is noted that, the adaptive modification of the various turn-on and/or turn-off parameters (e.g., including thresholds) increases the robustness of performing turning on and/or turning off of the light source improperly in response to various deleterious effects including additive white Gaussian noise (AWGN), impulse noise, etc. In other words, by performing adaptation of the various turn-on and/or turn-off parameters (e.g., including thresholds), there is less likelihood of performing improper turning on and/or turning off of the light source in response to such effects (e.g., false turning on and/or false turning off) that are not actual changes or control as directed by the electrical signal being received and by which the light source is to be turned on and/or off. Stated another way, the likelihood of performing such false turning on and/or false turning off is greatly mitigated by using such adaptively modified turn-on and/or turn-off parameters (e.g., including thresholds). For example, such turn-on and/or turn-off parameters (e.g., including thresholds) may be adapted in accordance with previous qualified turn-on's (e.g., associated with qualified signal thresholds (QSTs)).

At least one rationale for the "turn-on" epoch between "turn-on" detected and steady-state fidelity is based on the expectation that the received electrical signal (e.g., RF waveform) is to be transmitted and received across the optical link (including the optical to electrical converter) with high fidelity. However, prior to the achievement of steady-state optical power, the optical link may introduce distortion onto the RF signal modulating the optical power, and this distortion may be presented to the RF receiver after optical-to-electrical conversion. However, such a distorted waveform may be more useful at the RF receiver than no waveform (i.e., laser not turned on yet), especially if the distortion duration persists only for a limited number of symbols. More importantly, since with DOCSIS signal preambles, and the primarily considered STB signals, the modulation is at least initially QPSK, the peak signal envelopes which can occur with DOCSIS high density constellations will not be occurring early in the upstream burst transmissions. This means that during the early parts of these bursts there is less occurrence of the envelope peaking which may cause distortion, especially causing distortion when the optical carrier power has only reached a fraction of its steady-state level. When the "average" optical carrier power is charged to less than its steady-state level, the optical waveform is subject to introducing more distortion upon peaking RF envelopes than when fully charged to its steady-state level.

1. Before achieving within −0.5 dB (in one embodiment) of average steady-state optical power 2. FOR RF inputs which have lower instantaneous power than −1 dB of "problematic" RF instantaneous input power at steady-state (heuristic)

3. It is better to achieve several symbol durations where peaking may present more of a problem than in steady-state, than to have nothing of value to count on during these several symbols 4. (note: 90% of steady-state optical power is −0.5 dB, but corresponds to −1 dB RF input and output power)

Also, an adaptable turn-off threshold may be employed for a number of reasons. This may provide for a better accommodation of a large dynamic range of input signal levels. Also, this can accommodate a high density constellation dynamic range of largest and smallest power symbols, as well as dealing with any peaks and valleys that may occur during symbol transitions with low symbol rates.

In accordance with implementing such adaptive or adaptable thresholds for turn-on and turn-off, the following definitions may be employed: Burst Transmission Level, Final Burst Transmission Level, and Qualified Signal Threshold.

Burst Transmission Level: a period of time (e.g., 12 micro-second (or longer)) average level of signal burst. Such a Burst Transmission Level may be defined after turn-on has been initiated and maintained for some period of time (e.g., at least 12 micro-seconds). The Burst Transmission Level is the average R-ONU input power in the previous Tave seconds, where Tave=largest of value among a set (e.g., ranging from {12 micro-seconds, 50 micro-seconds}) which is less than the elapsed time since turn-on was initiated. The Burst Transmission Level may be clipped at a minimum of a predetermined value (e.g., 18 dBmV). If less than a period of time (e.g., 12 micro-seconds) has elapsed since turn-on was initiated, then Burst Transmission Level is UNDEFINED.

An example is provided here: if 40 micro-seconds have elapsed since turn-on was initiated, Tave will be 12 micro-seconds in one embodiment. Performing clipping of the Burst Transmission Level at a minimum value may prevent a situation where a signal envelope slowly drops and does not trigger turn-off. A relatively longer averaging time (e.g., 400 micro-seconds) may be needed if modulator orders above QPSK are to be used at symbol rates below some threshold (e.g., 1.28 MHz). Acquiring knowledge of the symbol rate within the R-ONU may be considered, and it could result in using a different Tave for the slowest symbol rates, and may also result in different adaptable turn-off thresholds and turn-off averaging times for different symbol rates, enhancing link performance.

Final Burst Transmission Level: Burst Transmission Level when turn-off decision is made for a signal burst. When turn-off is initiated, the Final Burst Transmission Level of the associated burst is the Burst Transmission Level at the time turn-off is initiated. If the turn-off is initiated in less than some period of time (12 micro-seconds) from the turn-on initiation, then no Final Burst Transmission Level is defined. The turn-on does not count in terms of Qualified Signal Threshold. A Final Burst Transmission Level is clipped at a maximum value (e.g., 60 dBmV).

Qualified Signal Threshold: Derived from Final Burst Transmission Level of recent "qualified" signal bursts. Such a Qualified Signal Threshold may be derived from the Final Burst Transmission Level of recent upstream bursts, and time elapsed since the most recent turn-off time. For example, if there have been no valid Burst Transmission Levels in some previous period of time (e.g., 30 seconds and i.e., no "turn-on" bursts of duration 12 micro-seconds or more in the previous 30 seconds), then the Qualified Signal Threshold is set to UNDEFINED. After every elapse of some period of time (e.g., after every 1 second has elapses since the most recent valid Final Burst Transmission Level was indicated), the Qualified Signal Threshold may be reduced in value by some amount (e.g., 1 dB), until reaching some particular value (e.g., 30 dBmV), or until the time-out occurs and then Qualified Signal Level is set to UNDEFINED. When a new Final Burst Transmission Level occurs, Qualified Signal Threshold may be set to the largest of a set of values: the existing Qualified Signal Threshold (if one exists) minus 1 dB, the new Final Burst Transmission Level, or some predetermined value (e.g., 30 dBmV).

With respect to the Qualified Signal Threshold, stability is provided via the mechanism for bringing the threshold slowly down if it was erroneously bumped up. For example, by subtracting such a value after every elapse of some period of time (e.g., subtracting 1 dB from the existing Qualified Signal Threshold after an elapse of every 1 second as described above). For example, this may deal with the situation of an erroneously large Final Burst Transmission Level somehow entering the system, for whatever reason, including power control variations by the CMTS, and the ensuing Qualified Signal Threshold Levels will eventually fall back to a correct value, even with new Final Burst Transmission Levels occurring more than once per second.

In some embodiments, a tighter fidelity requirement may be associated with the adaptive turn on and/or adaptive turn off capability. The ability to base turn off and/or turn on decisions on an adaptive threshold based on previously applied RF signals provides for more accuracy in discriminating desirable input conditions for turn on (or turn off) from undesirable input conditions for turn on (or turn off). One reason for the additional accuracy in the determination is that without adaptive thresholding the inherent inaccuracy of implementing a given fixed power value for a threshold, in terms of dBmV for example, adds to the uncertainty or imprecision of the determination; however with an adaptive threshold based on a comparison of a current input condition to a previous input condition, such an imprecision in an absolute level does not impact the determination, as any absolute error cancels in the comparison of the current value with the previous value. For example, turn on and turn off decisions based upon the adaptively learned Qualified Signal Threshold (QST) may have a tolerance of +−3 dB, while turn on and turn off decisions without learning or adaptation, or prior to learning or adaptation, may practically achieve an economical tolerance of only +−6 dB. Such fidelity requirements may make use of actual DOCSIS and other waveforms in subsequent specifications and/or tests. This type of requirement and test encompasses aspects of implementation performance such as controlling the averaging time, thresholds, and controlling the turn-on and turn-off times.

Figure 10:
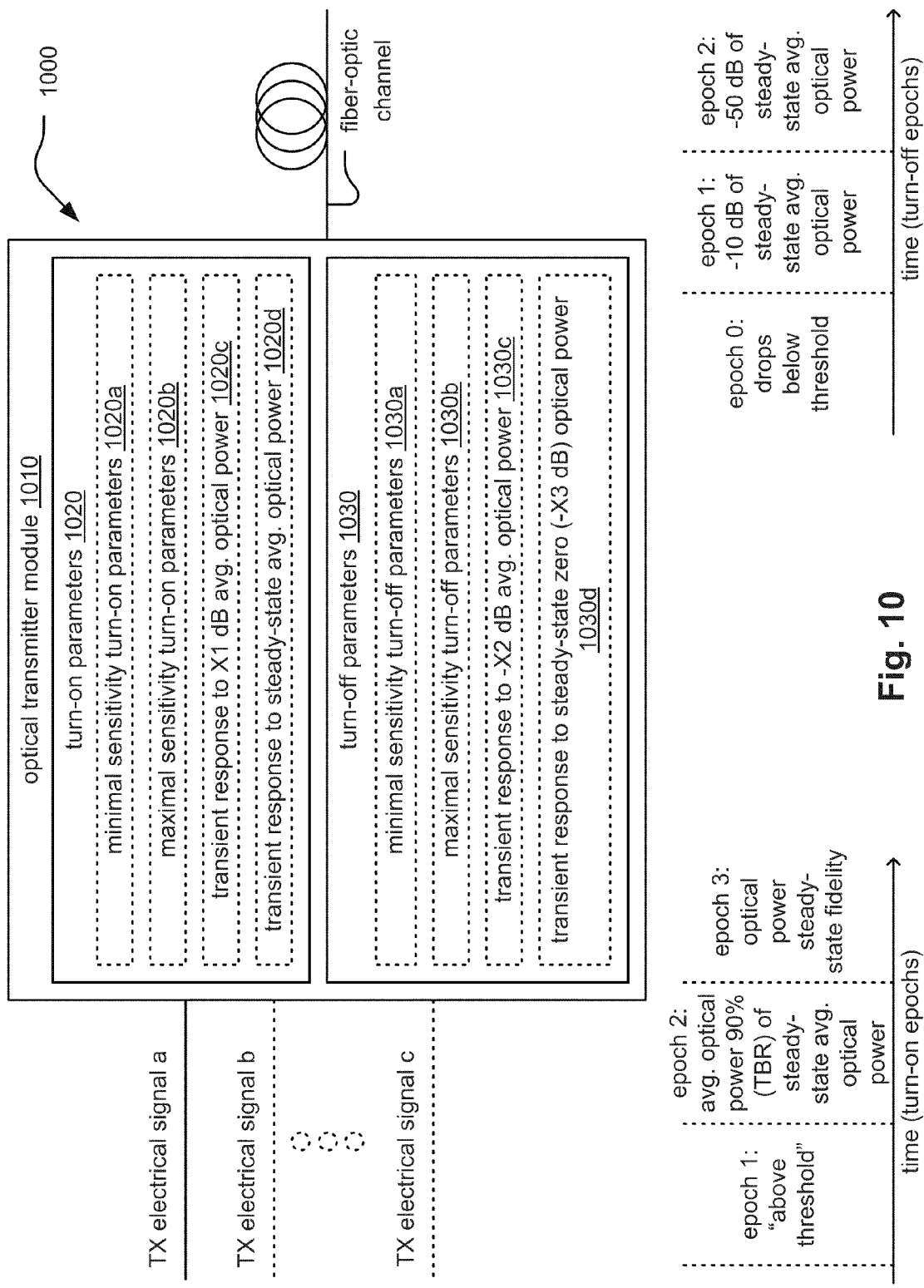
FIG. 10 illustrates an alternative embodiment of a communication system including a device that performs electrical to optical conversion of signals.

FIG. 10 illustrates an alternative embodiment of a communication system 1000 including a device that performs electrical to optical conversion of signals. Multiple electrical signals (e.g., transmit (TX) electrical signal a, TX electrical signal b, and up to electrical signal c) are provided to an optical transmitter module 1010. An optical signal is output there from via a fiber-optic channel to an optical to electrical interface at another end of the communication channel that may then provide an electrical signal to another communication device.

The optical transmitter module 1010 operates in accordance with a number of turn-on parameters 1020 and turn-off parameters 1030. Examples of the turn-on parameters 1020 include minimal sensitivity turn-on parameters 1020a, maximal sensitivity turn-on parameters 1020b, transient response to X1 dB average optical power 1020c, and transient response to steady-state average optical power 1020d. There are three "turn-on" epochs after R-ONU RF input is "above threshold".

Examples of the turn-off parameters 1030 include minimal sensitivity turn-off parameters 1030a, maximal sensitivity turn-off parameters 1030b, transient response to −X2 dB average optical power 1030c, and transient response to steady-state zero (−X3 dB) average optical power 1030d.

With respect to the turn-on parameters 1020, there may be three epochs or time periods: Epoch 1: an "Above threshold" RF input signal detected and optical transmitter commanded to "turn-on". Epoch 2: average optical transmit power reaches some threshold (e.g., 90%) of steady-state average optical transmit power. Epoch 3: Optical transmitter reaches steady-state fidelity.

With respect to the turn-off parameters 1030, there may be two epochs or time periods: Epoch 1: below a first predetermined value (e.g., −10 dB of the steady-state average optical power). Epoch 2: below a second predetermined value (e.g., −50 dB of the steady-state average optical power). It is of course noted that operation prior to the RF signal dropping below a predetermined value (threshold) may in fact be viewed as a separate epoch as well (e.g., Epoch 0), and may generally be referred to as the RF signal falling below threshold thereby triggering turn off.

Figure 11:
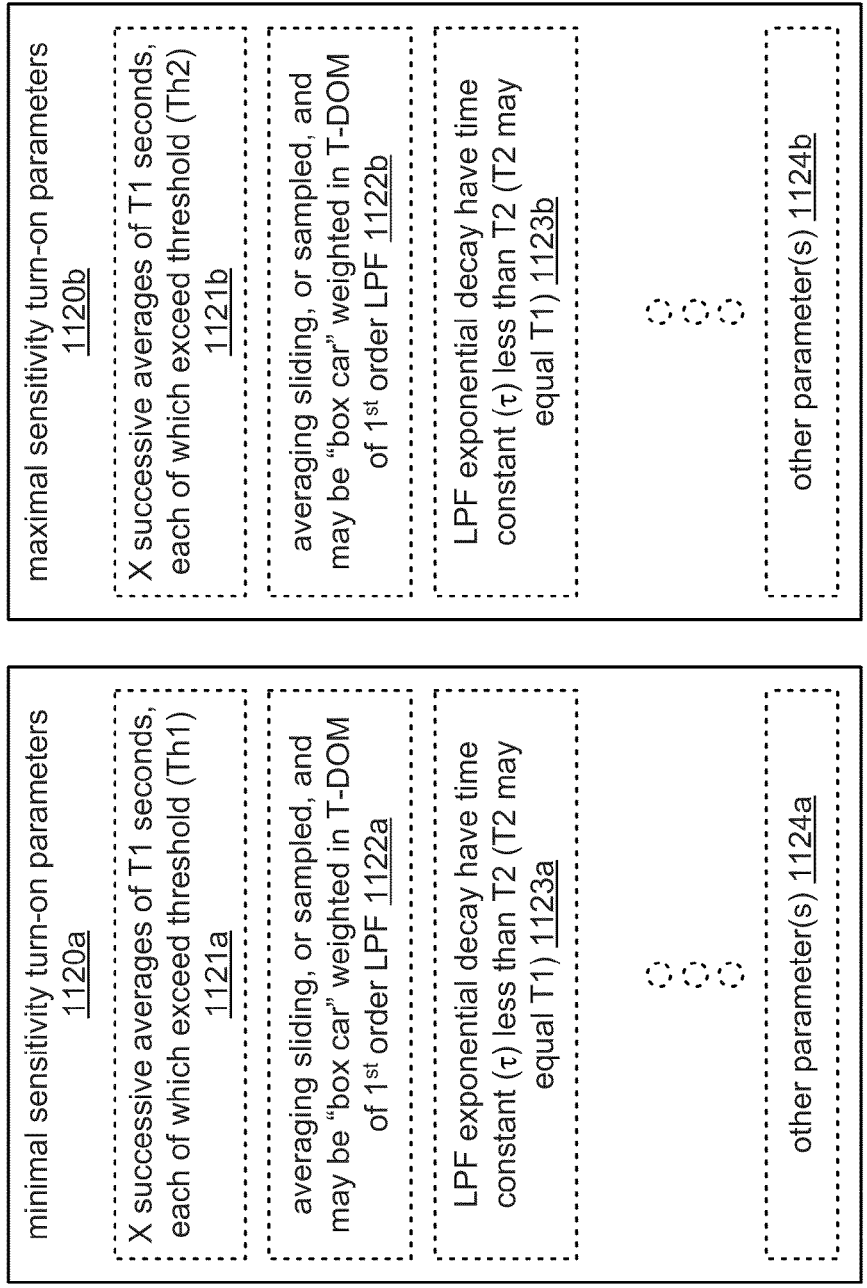
FIG. 11 illustrates an embodiment of various turn-on parameters as employed within an optical transmitter such as may be implemented within a communication system including optical components and communication links therein.

FIG. 11 illustrates an embodiment 1100 of various turn-on parameters as employed within an optical transmitter such as may be implemented within a communication system including optical components and communication links therein.

With respect to minimal sensitivity turn-on parameters 1120a, the "turn-on" MUST be initiated when the input signal power is at least above a threshold (Th1) (e.g., 21 dBmV (in one embodiment)) averaged over a span of T1 seconds (e.g., 100 nano-seconds), for a span of X seconds (e.g., 300 nano-seconds (in one embodiment)). This is performed over X (e.g., three) successive averages of Ts seconds (e.g., 100 nano-seconds) each in one embodiment, each of which indicate at least the threshold (Th1) (e.g., 21 dBmV) input signal power, and this must result in "turn-on" being initiated, as shown in a block 1121a. The averaging may be sliding or sampled, and may be "box car" weighting in the time domain or first order low pass filter, as shown in a block 1122a. Low pass filter exponential decay must have time constant no longer than 100 nano-seconds, as shown in a block 1123a. Also, one or more other parameters may also be employed, as shown in a block 1124a. Exemplary of another embodiment there is averaging of input power for 100 nanoseconds (for example), continuously computed (or for example, every 5 nanoseconds), and if the resulting average power is at or above threshold for 200 consecutive nanoseconds (or 41 consecutive computations at the 5 nanosecond update rate), then turn on is decided. In this embodiment, when averaging of input power for 100 nanoseconds (for example), continuously computed (or for example, every 5 nanoseconds), and the resulting average power is NOT at or above threshold for even one of the previous 200 consecutive nanoseconds (or 41 consecutive computations at the 5 nanosecond update rate), then turn on is NOT decided.

It is not practically useful to design a system which must turn on under some conditions, without having some conditions where the system must not turn on, also. As such, with a requirement to turn on when a signal is above a given threshold for a given amount of time, or an input signal's average power is above a given threshold for a given amount of time, to maintain a reasonable implementation complexity it is prudent to specify an input signal condition which must not trigger turn on. Since the turn on condition in accordance with the various principles presented herein involves computing the average signal power in some fashion, and monitoring a plurality of such averages for an amount of time (or equivalent), and comparing the results with a threshold, in order to reduce the complexity of such a device, tolerance or accuracy is built into the setting of the threshold, and also the duration of time necessary for continual (or continually sampled) meeting of the threshold. With respect to maximal sensitivity turn-on parameters 1120b, the "turn-on" MUST NOT be initiated when the input signal power is only a second threshold (Th2) (e.g., 15 dBmV (in one embodiment)) averaged over T1 seconds (e.g., 100 nano-seconds), for a span of X seconds (e.g., 300 nano-seconds (in one embodiment)). X (e.g., three) successive averages of T1 seconds (e.g., 100 nano-seconds) each, each of which indicate no more than a second threshold (Th2) (e.g., 15 dBmV) input signal power, must NOT result in "turn-on" being initiated. The averaging may be sliding or sampled, and may be "box car" weighting in the time domain or first order low pass filter, as shown in a block 1122b. Low pass filter exponential decay must have time constant no longer than 100 nano-seconds, as shown in a block 1123b. Also, one or more other parameters may also be employed, as shown in a block 1124b.

The transient response "turn-on" time to −0.5 dB average optical power: average optical power reaches to within −0.5 dB of steady-state (un-modulated or average) optical power. Optical carrier power (excluding signal modulation) MUST reach within −0.5 dB of (un-modulated) steady-state optical level within 200 nano-seconds after "turn-on" is initiated (in one embodiment). This corresponds to optical-electrical converter's DC output (average current over carrier cycle) rising to within 1 dB of its "steady-state" DC component. But with anticipated AC-coupled filtering, the true "steady-state" at the RF output port of the optical-electrical converter will drift back to zero. Thus, the reference to the optical-electrical DC output (average current over one carrier cycle) is just for explanation and not test.

The transient response "turn-on" time to steady-state is as follows. RF output MUST reach stabilization to within ±0.1 dB (in one embodiment) within 400 nano-seconds of optical power reaching −0.5 dB of (un-modulated or average) steady-state.

The initial transient response fidelity is as follows:

An attempt to prevent harmful characteristics which may cause significant degradation to burst receiver, during the initial turn-on. This also applies up to the point where reasonable signal quality is provided. This is presumably the point where −0.5 dB of optical steady-state power has been reached.

Certain turn-on requirements may be separated into the "presence" or "absence" of Qualified Signal Threshold. The turn-on requirements for detecting a signal may occur in pairs, and the conditions for MUST turn-on (minimal sensitivity), and conditions for MUST NOT turn-on (maximal sensitivity) may likewise be defined.

Turn-On Requirements: Absence of a Defined Qualified Signal Threshold

For example, the turn-on requirements in the absence of a defined Qualified Signal Threshold may be applied in the absence of a defined Qualified Signal Threshold. For these requirements, the average input signal power at time "t" is the average power of the input signal over the preceding 100 nano-seconds, t∈{t−100, t}. In accordance with the minimal sensitivity turn-off parameters 830a, the turn-on MUST be initiated when the average input signal power meets or exceeds some threshold (e.g., 21 dBmV) for some period of time (e.g., 200 consecutive nano-seconds).

In accordance with the maximal sensitivity turn-on parameters 820b (e.g., maximal sensitivity with signal drop or noise burst), the turn-on MUST NOT be initiated if the average input signal power has been below some threshold (e.g., 15 dBmV) for any instance within some previous period for time (e.g., the previous 190 nano-seconds).

At least one rationale for the turn-on epoch between turn-on detected and steady-state fidelity may be described as follows. The RF waveform is expected to be transmitted and received across the optical link (including optical-electrical converter) with high fidelity. This may be achieved after being within some value (e.g., −0.5 dB) of average steady-state optical power. For RF inputs which have lower instantaneous power than some value (e.g., −1 dB) of "problematic" RF instantaneous input power at steady-state, they may be heuristically determined. In some instances, it may be better to achieve link operation during several symbol durations where peaking may present more of a problem than in steady-state, than to have nothing of value to count on during these several symbols. It is noted that at some threshold value (e.g., 90%) of steady-state optical power is −0.5 dB, but this may correspond to −1 dB RF input and output power.

With respect to these turn-on requirements, some examples as may be employed in some embodiments are provided below for illustration to the reader. A margin for implementation is provided. For example, some threshold difference (e.g., 6 dB difference) between MUST turn-on and MUST NOT turn-on signal levels may be employed. These thresholds may be defined in terms of Absolute Power, not Relative Power. There may be some defined difference (e.g., 5% difference) between MUST turn-on and MUST NOT turn-on duration.

An example is provided for consideration. By applying a CW signal with power 21 dBmV, after a long duration of no input signal, this will just meet the conditions of the requirement after 300 nano-seconds of application. A 50% duty-cycle pulsed on/off CW signal, with 24 dBmV average power during the "on" portion of the cycle, with the cycling period of 100 nano-seconds, will just meet the conditions of the requirement. A 10% duty-cycle on-time for a pulsed CW signal of 100 nano-second cycling period, with 31 dBmV average power during on-time, will just meet the conditions of the requirement. A 90 nano-second burst of signal, surrounded by long periods of no signal, will not meet the requirements, no matter how large the signal is while on for the 90 nano-seconds. A 90 nano-second burst of noise or signal will not trigger MUST turn-on.

Another example is provided for consideration. By applying a CW signal with power 14 dBmV, after a long duration of no input signal, requires that the laser NOT turn-on, because the average input power never even reaches 15 dBmV. A 10% duty-cycle on-time for a pulsed CW signal of 100 nano-second cycling period, with 24 dBmV average power during on-time, requires that the laser NOT turn-on, again because the average input power never reaches 15 dBmV. A 15.5 dBmV CW signal applied for 250 nano-seconds and abruptly shut off, surrounded by long periods of no signal, requires that the laser NOT turn-on, because the average input power is 15 dBmV or greater for less than 185 nano-seconds, not maintaining the 15 dBmV level for a continuous 190 nano-seconds. Once the average input power drops below 15 dBmV, the 190 nano-second counter (up to 200 nano-seconds is allowed) is reset to zero. A 65 dBmV CW input applied for 80 seconds, surrounded by long periods of no signal, requires that the laser NOT turn-on. The average input power is only non-zero for 180 seconds, and thus is below the threshold 15 dBmV for less duration than 190 nano-seconds.

Turn-On Requirements: Presence of a Defined Qualified Signal Threshold

Such requirements apply in the presence of a defined Qualified Signal Threshold (QST) dBmV. For these requirements, the average input signal power at time "t" is the average power of the input signal over a preceding period of time (e.g., preceding 100 nano-seconds, t∈{t−100, t}).

In accordance with the minimal sensitivity turn-off parameters 830a, the turn-on MUST be initiated when the average input signal power meets or exceeds some threshold (e.g., QST−28 dB) for some period of time (e.g., 200 consecutive nano-seconds).

In accordance with the maximal sensitivity turn-on parameters 820b (e.g., maximal sensitivity with signal drop or noise burst), the turn-on MUST NOT be initiated if the average input signal power has been below some threshold (e.g., QST−31 dB) for any instance within some previous period for time (e.g., the previous 190 nano-seconds).

With respect to these turn-on requirements, some examples as may be employed in some embodiments are provided below for illustration to the reader. A margin for implementation is provided. For example, some threshold difference (e.g., 3 dB difference) between MUST turn-on and MUST NOT turn-on signal levels may be employed. As with other embodiments, these thresholds may be defined in terms of Relative Power, not Absolute Power, since they are relative to the Qualified Signal Threshold previously established by the R-ONU. There may be some defined difference (e.g., 5% difference) between MUST turn-on and MUST NOT turn-on duration (e.g., such as same as with detecting an initial upstream burst).

Turn-On Requirements: Transient Response

Such requirements apply, and begin their reference start time, immediately upon an input condition satisfying the requirements of turn-off Time to 90% Optical Power: the optical carrier power (excluding signal modulation) MUST reach within some value (e.g., −0.5 dB) of (un-modulated) steady-state optical level within some period of time (e.g., 200 nano-seconds).

Time to Steady-State Optical Power: the RF output MUST reach stabilization to within some tolerance (e.g., ±0.1 dB) within some period of time (e.g., 500 nano-seconds).

Slewing and Settling: certain requirements such as provided in DOCSIS for slewing may be employed. For example, each transmitter MUST control spurious emissions, prior to and during ramp-up, during and following ramp-down, and before and after a burst. On/off spurious emissions, such as the change in voltage at the upstream transmitter output, due to enabling or disabling transmission, MUST be no more than some value (e.g., 100 mV). Such a step MUST be dissipated no faster than some period of time (e.g., 2 µs) of constant slewing. This requirement applies when the CM is transmitting at some value (e.g., +55 dBmV) or more per channel on any channel.

Some additional comments on the transient response are provided below.

With respect to the initial transient response fidelity, an attempt to prevent harmful characteristics which may cause significant degradation to burst receiver, during the initial turn-on and also during turn-off may be performed. This applies up to the point where reasonable signal quality is provided (during turn-on). This would presumably be the point where −0.5 dB of optical steady-state power has been reached. Along these lines, more details are included in DOCSIS specification. The DOCSIS specification is referenced to CM output, and may be needed to translate to optical-electrical converter output.

With respect to the transient response "turn-on" time to −0.5 dB average optical power, this would mean the time that it takes for the average optical power to reach within −0.5 dB of steady-state (un-modulated or average) optical power. This corresponds to optical-electrical converter's DC output (averaged over carrier cycle) rising to within 1 dB of its "steady-state" DC component. With anticipated AC-coupled filtering, the true "steady-state" at the RF output port of the optical-electrical converter will drift back to zero. Therefore, the reference to the optical-electrical DC output (averaged over one carrier cycle) may be needed only for explanation and not testing.

With respect to the transient response "turn-on" time to steady-state, the RF output MUST reach stabilization to within some tolerance (e.g., ±0.1 dB), and there may be a similar requirement for stability or "glitchlessness" in DOCSIS.

Figure 12:
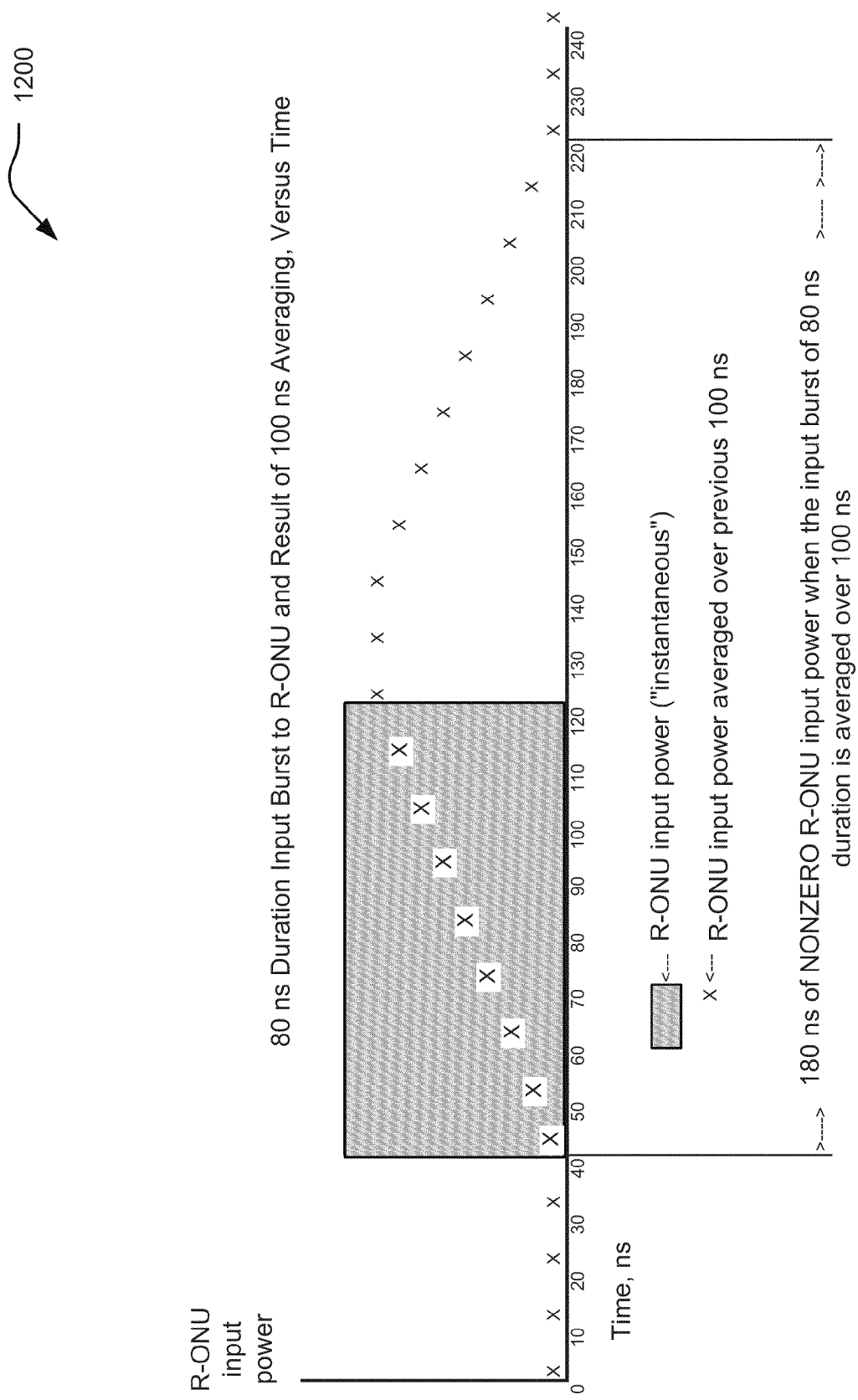
FIG. 12 illustrates an embodiment of 80 nano-second isolated noise burst and MUST NOT turn-on requirement.

FIG. 12 illustrates an embodiment 1200 of 80 nano-second isolated noise burst and MUST NOT run-on requirement.

Figure 13:
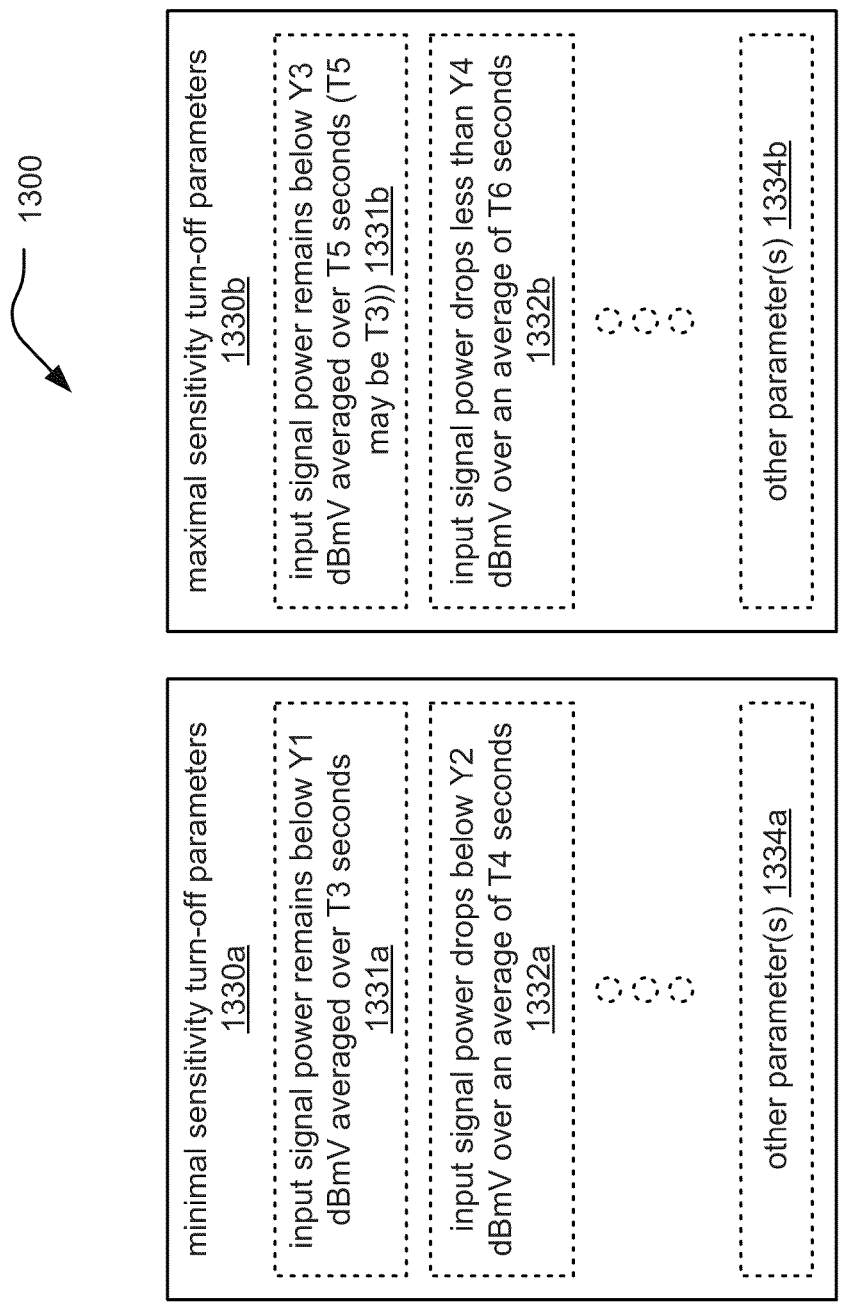
FIG. 13 illustrates an embodiment of various turn-off parameters as employed within an optical transmitter such as may be implemented within a communication system including optical components and communication links therein.

FIG. 13 illustrates an embodiment 1300 of various turn-off parameters as employed within an optical transmitter such as may be implemented within a communication system including optical components and communication links therein.

With respect to minimal sensitivity turn-off parameters 1330a, the "turn-off" MUST be initiated when the input signal power is below a threshold Y1 (e.g., 12 dBmV) averaged over T3 seconds (e.g., 400 nano-seconds (in one embodiment)), as shown in a block 1331a. In one embodiment, the 400 nano-seconds is far longer than desired for a 5.12 MHz upstream modulation rate. However, even this duration may be too short for the 1.28 MHz upstream modulation rates.

One alternative which merits consideration is making "turn-off" initiate due to a DROP of power by a certain amount, a threshold Y2 dBmV, over a short period of time of T4 seconds compared to the average power over a much longer period of time. This is as opposed to "set absolute thresholds," and this might enable much more quick and reliable "turn-off" time.

With respect to maximal sensitivity turn-off parameters 1330b, the "turn-off" MUST NOT be initiated if signal power remains above a threshold below Y3 (e.g., 15 dBmV) for an average of T5 seconds (e.g., 400 nano-seconds). This requirement is NOT necessarily applicable when conditions for the SECONDARY Minimal Sensitivity condition are satisfied, IF the secondary condition is included.

This requirement's basic threshold (15 dBmV) is placed at the Max Sensitivity "turn-on" threshold of (15 dBmV). To avoid CYCLING, it is considered unwise to allow a Max Sensitivity "turn-off" threshold ABOVE a Max Sensitivity "turn-on" threshold. A second condition is considered, the "turn-off" MUST NOT be initiated when the input signal power drops less than 20 dB over an average of some duration (of a first particular length), compared to the average over the previous duration (of a second particular length). It is noted that this requirement is NOT applicable when conditions for the PRIMARY Minimal Sensitivity are satisfied.

It is noted that if floating "turn-off" conditions are written into the requirements, "turn-on" requirements need adjustment to avoid cycling when "turn-off" occurs at higher power.

The transient response "turn-off" time to −10 dB of steady-state, and the optical power MUST reach below −10 dB of steady-state level within 200 nano-seconds (in one embodiment).

The transient response "turn-off" time to steady-state may be defined as when the optical power must reach below −50 dB (in one embodiment) of steady-state within 400 nano-seconds of reaching −10 dB of steady-state. (in one embodiment).

Turn-Off Requirements: Structure

The turn-off requirements are separated into bursts which are shorter or longer than a particular duration of time (e.g., 12 micro-seconds).

For discussion, a duration of 12 micro-seconds is employed. When shorter than 12 micro-seconds, turning-off a valid signal burst must be avoided at all costs. It may be desirable to avoid a false trigger always resulting in a 12 micro-second laser burst. Turning-off a falsely triggered laser burst before 12 micro-seconds may prevent the false burst from setting a Qualified Signal Threshold which may be erroneous.

When shorter than 12 micro-seconds, the turn-off may be separated further into an absence and presence of a Qualified Signal Threshold. For example, when considering the turn-off requirements with less than 12 micro-seconds of turn-on time, such requirements may apply when there have been fewer than 12 micro-seconds elapsed since the input signal satisfied "turn-on" conditions as described elsewhere herein (e.g., with respect to transient response turn-off time to −10 dB of steady-state optical power or alternatively, transient response "turn-off" time to steady-state). For these requirements, the average input signal power at time "t" is the average power of the input signal over a preceding period of time (e.g., 400 nano-seconds, $t \in \{t-400, t\}$).

In the absence of a Qualified Signal Threshold, there may be no reliable, relative threshold level available for the turn-off decision. Such turn-off requirements in the absence of a defined qualified signal threshold may be partitioned into a minimal sensitivity (e.g., turn-off MUST be initiated when the average input signal power drops below −5 dBmV) and a maximal sensitivity (e.g., turn-off MUST NOT be initiated when the average input signal power remains above +1 dBmV).

In the presence of a Qualified Signal Threshold, there may be a reliable, relative threshold level available for turn-off decision. Turn-off with very low input power level may also be provided; though, this may not be an exclusively relative threshold.

When longer than 12 micro-seconds, the turn-off need not necessarily be separated into the presence or absence of Qualified Signal Threshold. With 12 or more seconds of signal burst, the established burst level of the burst is used for the relative turn-off threshold.

The turn-off requirements for detecting a signal may occur in pairs. Conditions may be set for MUST turn-off (i.e., minimal sensitivity), and similarly conditions for MUST NOT turn-off may be set (i.e., maximal sensitivity). These requirements may apply in the presence of a defined Qualified Signal Threshold (e.g., QST dBmV). In some embodiments, with respect to the minimal sensitivity, the turn-off MUST be initiated when the average input signal power drops below QST−35 dB OR drops below −5 dBmV. With respect to maximal sensitivity, turn-off MUST NOT be initiated when the average input signal power remains above a particular value (e.g., QST−32 dBmV AND +1 dBmV).

Some comments with respect to turn-off with less than 12 micro-seconds are provided below. The signal input level may be defined with 400 nano-second averaging time for turn-off compared to 100 nano-seconds averaging time for turn-on. This can greatly reduces envelope variation due to symbol transitions with ≥1.28 MHz modulation rates. It may also allow higher threshold for turn-off, and thus faster (but still robust) turn-off decisions, and also provide for shorter averaging time for turn-on allows faster turn-on decision. Variation due to symbol transitions will typically not be a severe problem for turn-on decision.

Some consideration of SCTE 55-1 and 55-2 low symbol rate modulations are provided as well. The very low symbol rates of SCTE 55-1 and SCTE 55-2, with 8 micro-second symbol durations, may be handled differently. With 8 micro-second symbol duration, even with QPSK, symbol transitions can produce very low envelope level for an "instant". Using 400 nano-second averaging may preclude a number of things including, INF readings, but even doubling to 800 nano-seconds may not provide much improvement in lowest envelope level during low symbol rate transitions.

The SCTE 55s' low symbol rate envelope dips should be examined compared with the MUST NOT turn-off threshold of QST−32 dB.

If SCTE 55-1 or SCTE 55-2 signal levels are far below DOCSIS signal levels, the thresholds could present a problem by referencing to QST level. For example, if DOCSIS is only 5 dB above the SCTE 55's the QST−32 dB should work. A larger averaging time than 400 nano-seconds should be considered if SCTE levels are more than 5 dB below DOCSIS.

NOT USING a relative threshold during first 12 micro-seconds, even with a defined QST, is an option to consider if SCTE-55's can be more than 5 dB below DOCSIS levels. For example, relying only on absolute level for turn-off during first 12 micro-seconds means avoiding triggering turn-off unless the input signal drops below +1 dBmV averaged over 400 nano-seconds.

With respect to turn-off requirements with 12 micro-seconds or more of turn-on time, such requirements apply when there have been at least 12 micro-seconds elapsed since the input signal satisfied turn-on conditions described elsewhere herein (e.g., with respect to turn-on requirements in the absences of a Defined Qualified Signal Threshold, or alternatively, turn-on requirements in the presences of Defined Qualified Signal Threshold). For these requirements, the average input signal power at time "t" is the average power of the input signal over the a preceding period of time (e.g., preceding 400 nano-seconds, $t \in \{t-400, t\}$). Again, such turn-off requirements for detecting a signal may occur in pairs. Conditions may be set for MUST turn-off (i.e., minimal sensitivity), and similarly conditions for MUST NOT turn-off may be set (i.e., maximal sensitivity). With respect to minimal sensitivity, the turn-off MUST be initiated when the average input signal power drops below Burst Transmission Level −23 dB. With respect to the maximal sensitivity, the turn-off MUST NOT be initiated when the average input signal power remains above Burst Transmission Level −20 dB.

Some comments with respect to turn-off with more than 12 micro-seconds or more of turn-on time are provided below. The Burst Transmission Level may be clipped at a minimum of 18 dBmV. The turn-off will ensue if the signal level drops below −5 dBmV (e.g., averaged for 400 nano-seconds) regardless of other conditions.

A −23 dB delta provides for turn-off to begin roughly 2 to 3 symbols after the last symbol center for the DOCSIS signals. With higher orders of modulation, there can and will be some variation on the Burst Transmission Level.

The Burst Transmission Level is structured to average over many DOCSIS symbols and takes advantage of more averaging time for longer duration bursts. A longer averaging time for Burst Transmission Level (e.g., 400 micro-seconds), could be considered with an eye toward the slower modulation rates of SCTE 55-1 and SCTE 55-2. With higher orders of modulation the signal level (e.g., averaged over 400 nano-seconds) after the last symbol center will vary from the QPSK case depending on the data, impacting the turn-off decision. With several low-power constellation points at the end of a burst, a turn-off decision could be made more quickly. In general, faster turn-off (faster than the 2 to 3 symbol delay past the last symbol center) will negatively impact the quality of the last symbols in the burst. By assuring turn-off decision at least one symbol center from the last symbol's center, even the last symbol is only fairly modestly impacted. A 16 dB SNR contribution may be associated for truncation one symbol past the last symbol center. A 23 dB SNR impact may be associated for delaying truncation to 2 symbols past the last symbol center. With a finite, rather than abrupt, turn-off transient, it is possible that the SNR limitations imposed by turn-off induced truncation would be less severe.

With respect to SCTE 55-1 and SCTE 55-2, same concern as stated on earlier slide, with low envelope during symbol transitions with 400 nano-second average and 8 micro-second symbol duration.

Turn-Off Requirements: Transient Response

With respect to turn-off transient response requirements, such requirements apply, and begin their reference start time, immediately upon an input condition satisfying the requirements as described elsewhere herein (e.g., regarding turn-off requirements with 12 micro-seconds or less, or alternatively, 12 micro-seconds or more of turn-on time).

With respect to the transient response turn-off time to −10 dB of steady-state optical power, the optical power MUST reach below −10 dB of steady-state level within some period of time (e.g., 200 nano-seconds).

With respect to the transient response "turn-off" time to steady-state, the optical power must reach below −50 dB of steady-state within a particular period of time (e.g., 500 nano-seconds).

With respect to slewing and settling, many of the practices with respect to DOCSIS may be employed here as well. For example, each transmitter MUST control spurious emissions, prior to and during ramp-up, during and following ramp-down, and before and after a burst. On/off spurious emissions, such as the change in voltage at the upstream transmitter output, due to enabling or disabling transmission, MUST be no more than 100 mV. Such a step MUST be dissipated no faster than 2 µs of constant slewing. This requirement applies when the CM is transmitting at +55 dBmV or more per channel on any channel.

Turn-On and Turn-Off: Indirectly Related Requirements

These are possible requirements to consider regarding upstream modulation fidelity which indirectly are related to turn-on and turn-on performance.

With respect to initial transient response modulation fidelity, an attempt to prevent harmful transmission characteristics which may cause significant degradation to receiver, during the initial turn-on, up to the point where reasonable signal quality is provided, such as up to a point of steady-state (e.g., −0.5 dB of steady-state) has been reached.

With respect to settling transient response modulation fidelity, an attempt to ensure some moderate-to-high fidelity of the modulation signal after reaching within a point of steady-state level (e.g., −0.5 dB of steady-state level). This could be useful signal to burst receivers, even though not good enough to provide high capacity if persisting for a long duration.

As in many communication systems, clipping, saturation, large surges, abrupt surges, etc., may be of a concern.

Adaptive Turn-Off and Turn-On Thresholds

The use of adaptively determined and modified turn-on and turn-off thresholds, in accordance with the various principles presented herein, mitigates dynamic range demands for most often used data bursts. This allows for the use of relative thresholds instead of using absolute thresholds.

In accordance with this novel approach, three new parameters defined and used for use in accordance with such adaptively determined and modified turn-on and turn-off thresholds, including Transmission Burst Level, Final Transmission Burst Level, and Qualified Signal Threshold.

With respect to the Turn-on and Turn-off Requirements, such requirements on making turn-on and turn-off decisions are paired together (e.g., with respect to MUST and MUST NOT requirements)

Certain embodiments may avail themselves to particular operational considerations/rules/limitations suggested. For example, some embodiments may only use QPSK modulation for symbol rates <1.28 MHz. in accordance with such embodiments, SCTE 55-1 and 55-2 signal levels may be maintained within −5 dBc to 0 dBc of DOCSIS signal levels (therefore will be much higher energy per symbol).

Figure 14B:
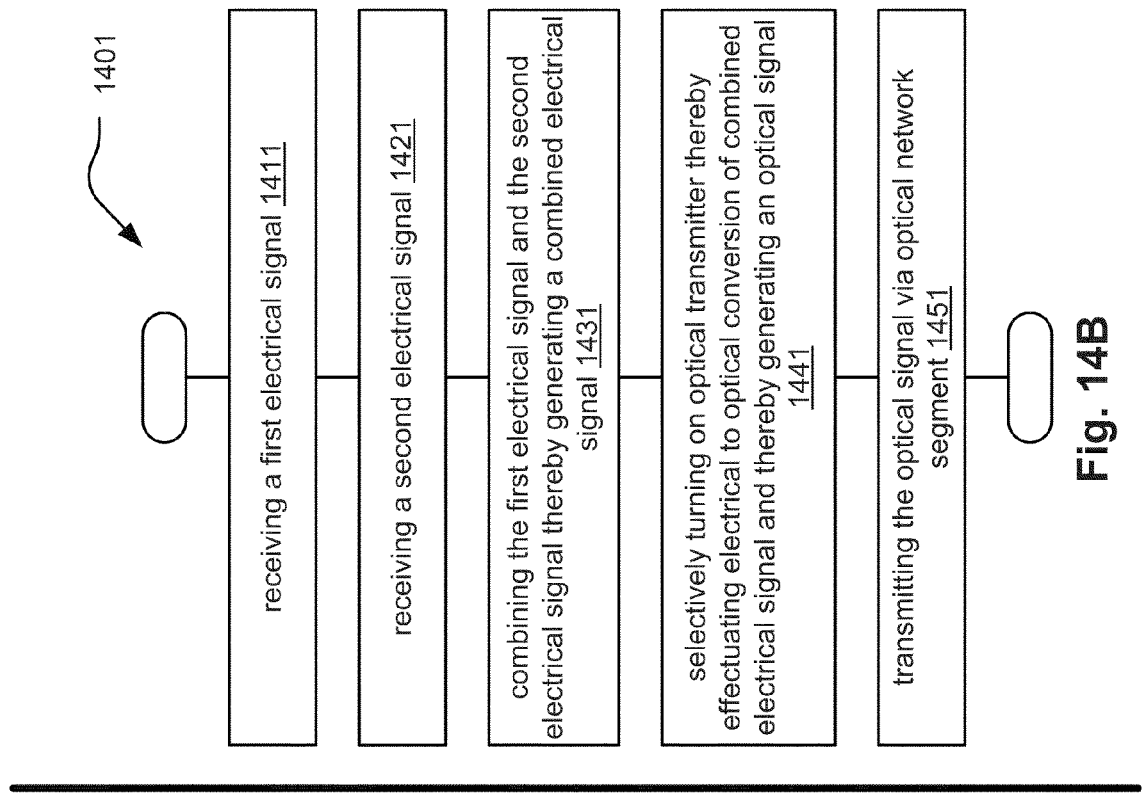
FIG. 14B illustrates an alternative embodiment of a method for operating a communication system including optical components and communication links therein.
Figure 14A:
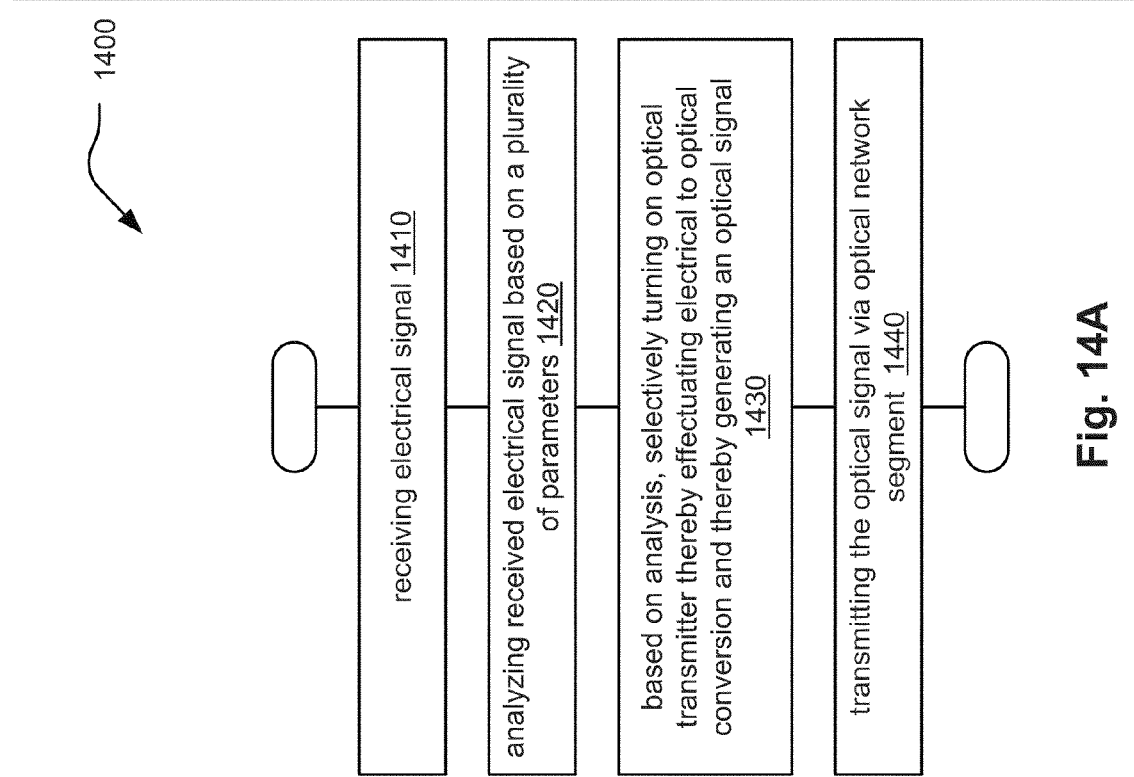
FIG. 14A illustrates an embodiment of a method for operating a communication system including optical components and communication links therein.

FIG. 14A illustrates an embodiment of a method 1400 for operating a communication system including optical components and communication links therein.

Referring to method 1400 of FIG. 14A, the method 1400 begins by receiving electrical signal, as shown in a block 1410. The method 1400 continues by analyzing received electrical signal based on a plurality of parameters, as shown in a block 1420.

The method 1400 then operates by based on analysis, selectively turning on optical transmitter thereby effectuating electrical to optical conversion and thereby generating optical signal, as shown in a block 1430. The method 1400 continues by transmitting optical signal via optical network segment, as shown in a block 1440.

FIG. 14B illustrates an alternative embodiment of a method 1401 for operating a communication system including optical components and communication links therein. Referring to method 1401 of FIG. 14B, the method 1401 begins by receiving a first electrical signal, as shown in a block 1412. The method 1401 then operates by receiving a second electrical signal, as shown in a block 1421.

The method 1401 continues by combining the first electrical signal and the second electrical signal thereby generating a combined electrical signal, as shown in a block 1431. The method 1401 then operates by selectively turning on optical transmitter thereby effectuating electrical to optical conversion of combined electrical signal and thereby generating an optical signal, as shown in a block 1441. The method 1401 continues by transmitting the optical signal via optical network segment, as shown in a block 1451.

Figure 15:
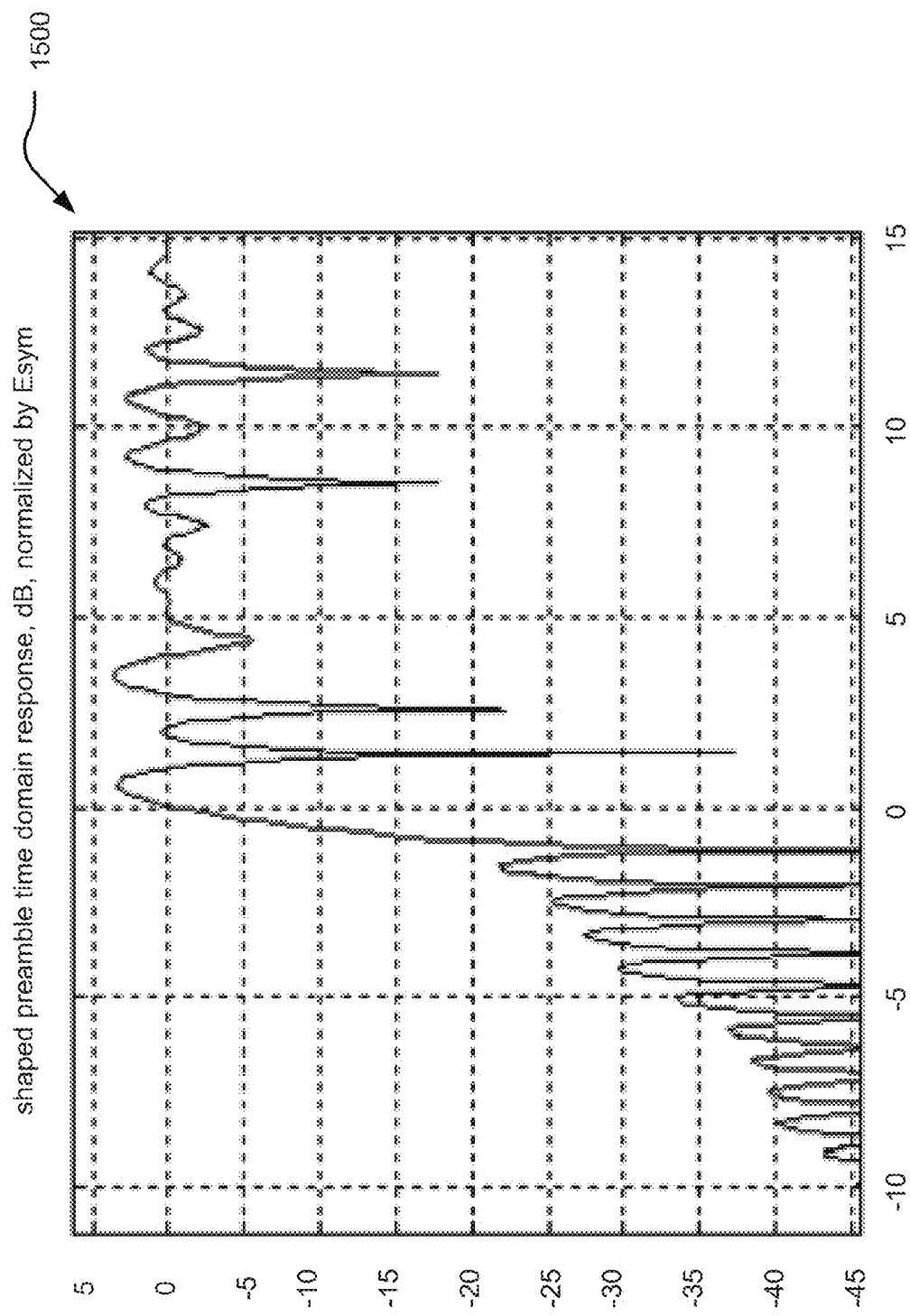
FIG. 15 illustrates an embodiment of a shaped preamble time domain response, dB, normalized by symbol energy (Esys).

FIG. 15 illustrates an embodiment 1500 of a shaped preamble time domain response, dB, normalized by symbol energy (Esys).

Figure 16:
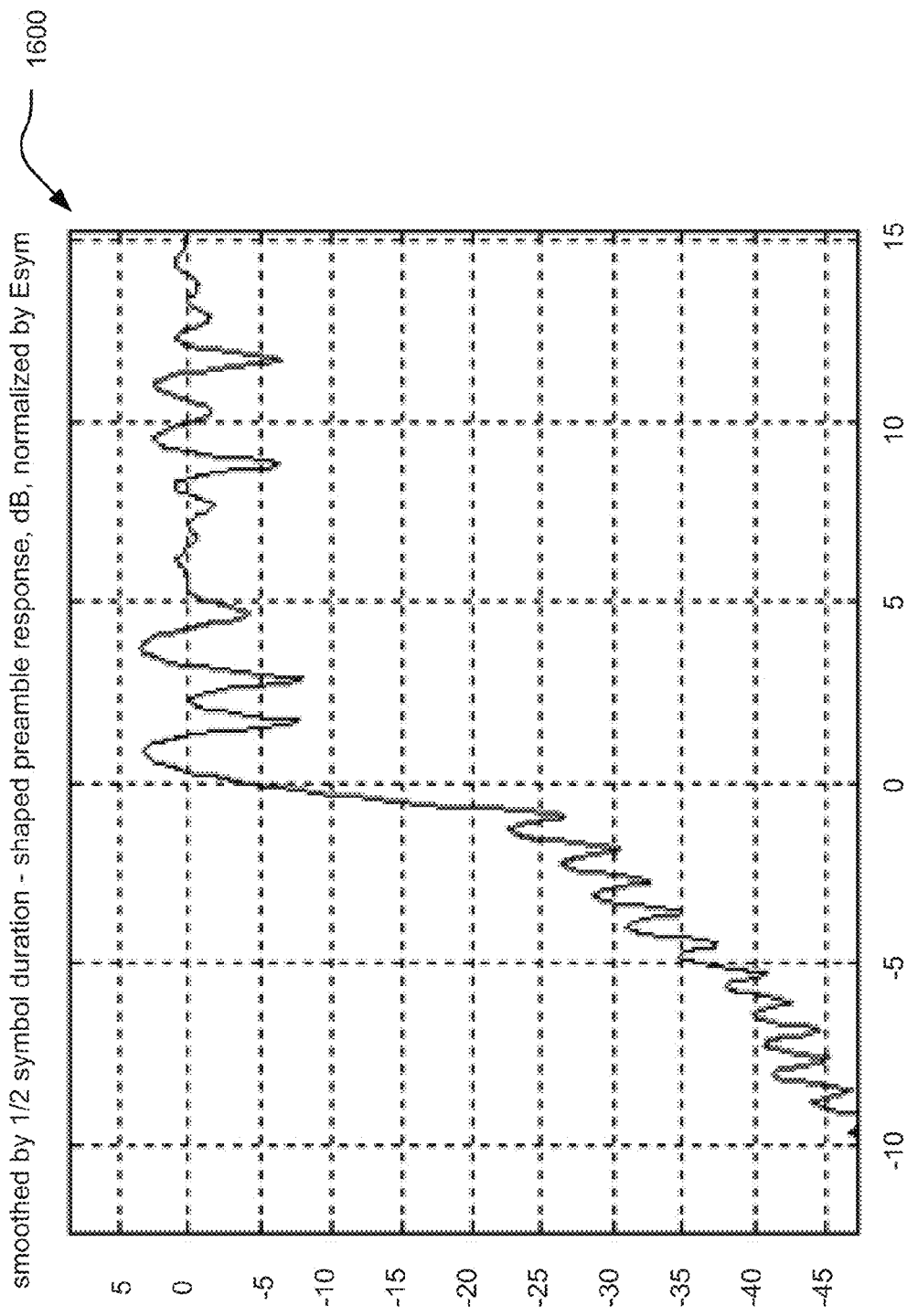
FIG. 16 illustrates an embodiment of a shaped preamble time domain response, dB, normalized by symbol energy (Esys), after having been smoother by a ½ symbol duration.

FIG. 16 illustrates an embodiment 1600 of a shaped preamble time domain response, dB, normalized by symbol energy (Esys), after having been smoother by a ½ symbol duration.

Figure 17:
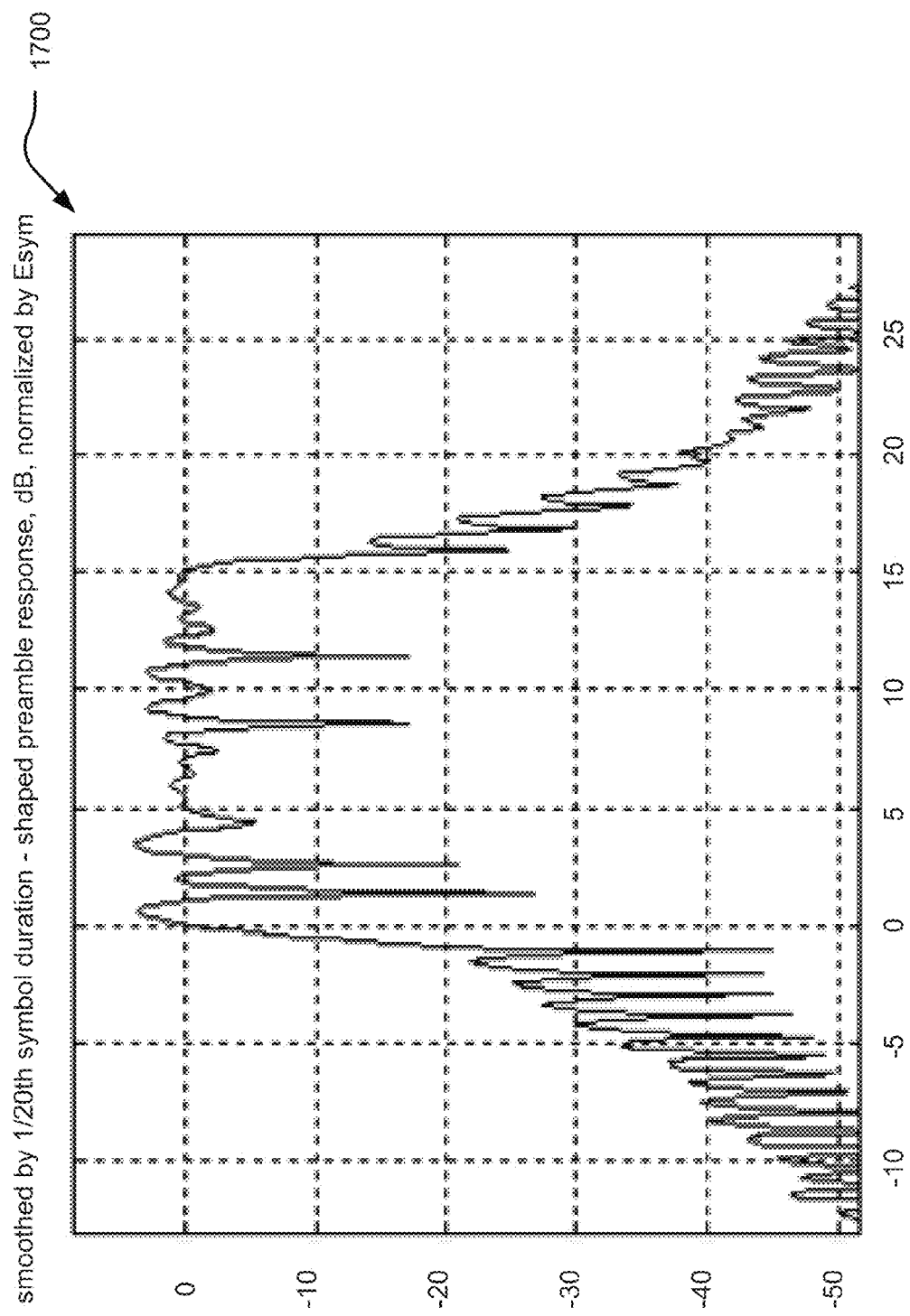
FIG. 17 illustrates an embodiment of a shaped preamble time domain response, dB, normalized by symbol energy (Esys), after having been smoothed by a $\frac{1}{20}^{th}$ symbol duration.

FIG. 17 illustrates an embodiment 1700 of a shaped preamble time domain response, dB, normalized by symbol energy (Esys), after having been smoother by a $\frac{1}{20}^{th}$ symbol duration.

Figure 18:
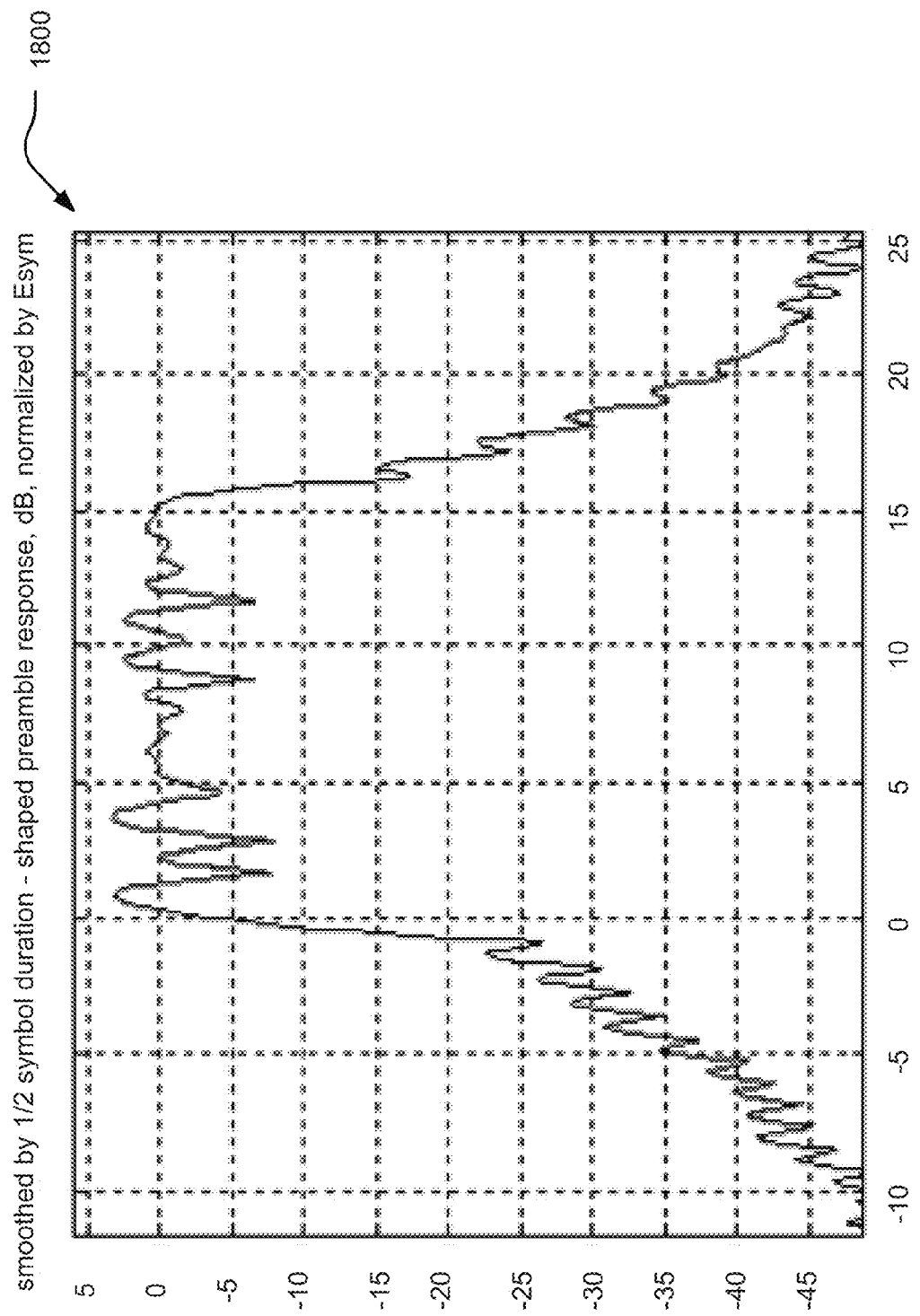
FIG. 18 illustrates an embodiment of a shaped preamble time domain response, dB, normalized by symbol energy (Esys), after having been smoothed by a ½ symbol duration.

FIG. 18 illustrates an embodiment 1800 of a shaped preamble time domain response, dB, normalized by symbol energy (Esys), after having been smoother by a ½ symbol duration.

Figure 19:
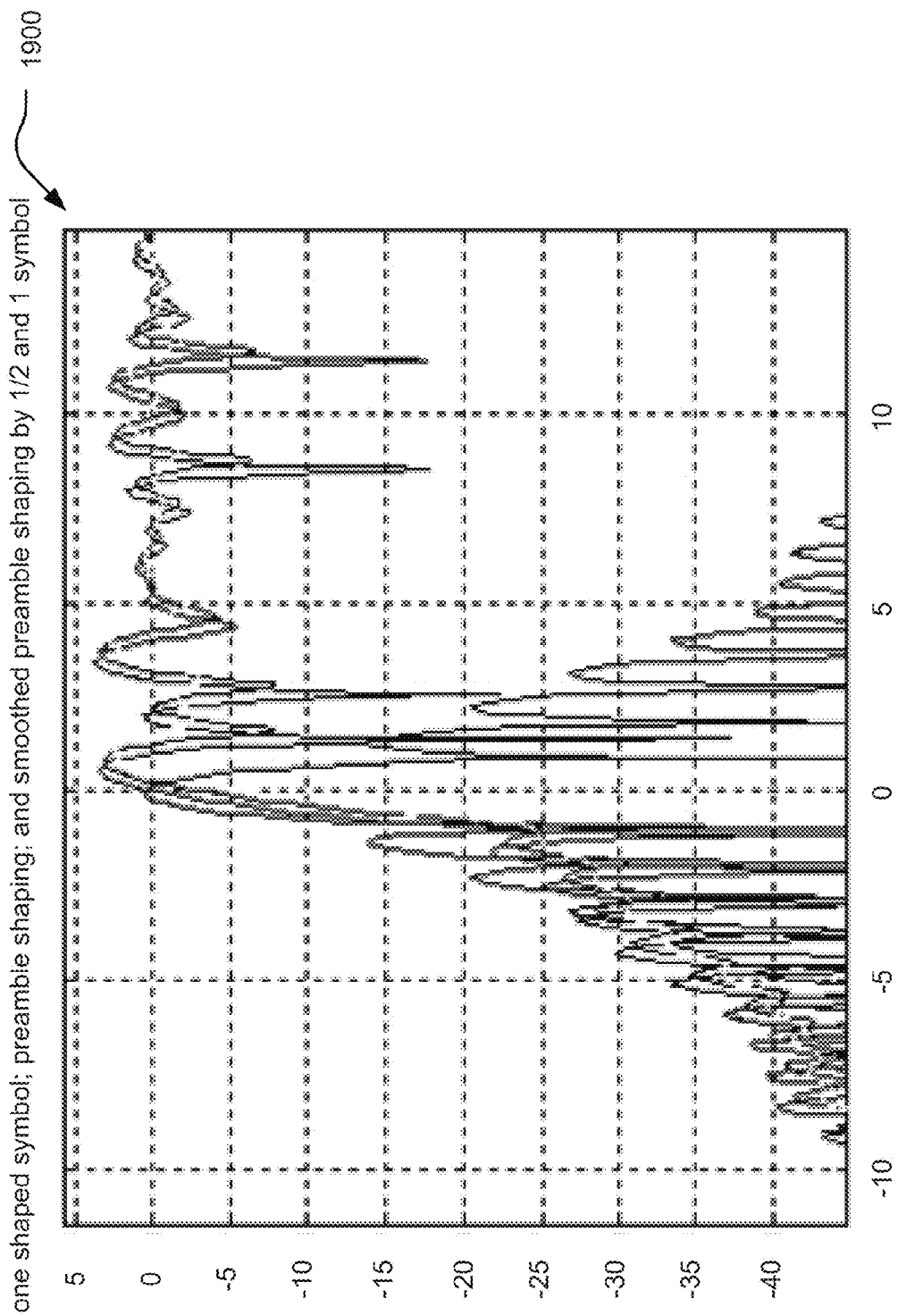
FIG. 19 illustrates an embodiment showing each of one shaped symbol, preamble shaping, and smoothed preamble shaping by ½ and 1 symbol.

FIG. 19 illustrates an embodiment 1900 showing each of one shaped symbol, preamble shaping, and smoothed preamble shaping by ½ and 1 symbol.

The following diagrams of FIG. 21-24 deal with operations as may be performed in accordance with turning on and turning off of operating optical transmitters such as may be employed within communication systems that include at least one optical component therein. Generally speaking, while certain labels such as STATE A and STATE B are employed in these diagrams, the implementation of these methods may be viewed as including ten different states.

FIG. 20, FIG. 21, FIG. 22, FIG. 23, and FIG. 24, considered together, illustrate an alternative embodiment of a combined method of performing signal detection in accordance with optical transmitters, including adaptive threshold for turn-on, absolute threshold for turn-on, and automatically transitioning between the two modes.

Particularly, FIG. 20 and FIG. 21, considered together, illustrate an embodiment of a method for performing signal detection in accordance with optical transmitters.

The operations shown in FIG. 20 and FIG. 21 correspond to operation with no Qualified Burst and may be generally referred to as Branch A. STATE A is at the top of this branch. If an upstream burst is detected and subsequently "qualified," then the operation moves to STATE B (i.e., Branch B). Branch B operation is shown in the subsequent figures.

Particularly, FIG. 22, FIG. 23, and FIG. 24, considered together, illustrate an alternative embodiment of a method for performing signal detection in accordance with optical transmitters, including adaptive threshold for turn-on.

The operations shown in FIG. 22, FIG. 23, and FIG. 24 correspond to operation with a Qualified Burst and may be generally referred to as Branch B. STATE B is at the top of this branch. From STATE B, two paths through the flow chart operate simultaneously (e.g., the horizontal and vertical axes).

Vertically, testing against the turn-on threshold (adaptive threshold for the Qualified Burst state) is continuously operated. If the threshold is exceeded, then the vertical flow continues down the diagram. Horizontally, the QST_timer is running and decrementing the Qualified Signal Threshold if significant time elapses (e.g., as compared to some threshold)

before another Qualified Burst. Again, the horizontal path is flowing in parallel with the vertical path.

Referring to the horizontal axis, the QST_timer operation in accordance with the operation with Qualified Burst (e.g., STATE B). Horizontally, the QST_timer is running and decrementing the Qualified Signal Threshold if significant time elapses before another Qualified Burst. This horizontal path is again flowing in parallel with the vertical path. The flow of the horizontal path progresses toward the right when the Branch B vertical path is "stuck" cycling at the top of its vertical branch (e.g., when no upstream bursts are triggering the turn-on threshold). If the turn-on threshold is exceeded, but the burst fails to "qualify," the horizontal flow continues rightward. In the event a burst does not "qualify" the horizontal path does not rest to the left, then the QST_timer does not reset to zero. If an upstream burst DOES "qualify" the horizontal path resets to the left (State B) and QST_timer_secs is reset to zero.

Also, as described elsewhere herein, there are two modes for measuring input power for threshold comparisons. For example, the first power mode (depicted by α), the input power to the R-ONU is the average input power over a first, previous period of time (e.g., 100 nano-seconds). The second power mode (depicted by β), the input power to the R-ONU is the average input power over a second, previous period of time (e.g., 400 nano-seconds).

FIG. 20 and FIG. 21, considered together using reference numerals 2001 and 2002, illustrate an embodiment of a method for performing signal detection in accordance with optical transmitters. These diagrams (FIG. 20 and FIG. 21) illustrate an embodiment of operation that is performed when no Qualified Burst has been identified or detected within a previous period of time (e.g., within previous 30 seconds).

The method of these diagrams begins in STATE A. The device starts up (with no Qualified Signal Threshold (QST)), and initially operates in the first power mode (depicted by α). The first input power mode (depicted by α) uses a definition of "input power" to mean the average input power to the R-ONU over a first, previous period of time (e.g., 100 nano-seconds). A second input power mode (depicted by β) uses a definition of "input power" to mean the average input power to the R-ONU over a second, previous period of time (e.g., 400 nano-seconds).

It is then tested whether the input power is greater than a first threshold (Th1). In some instances, this first threshold is 18 dBmV (i.e., Th1=18 dBmV). If the input power is less than this first threshold (Th1), then the method returns back to the start up block.

Alternatively, if the input power is greater than this first threshold (Th1), then the method tests whether the input power stays above a threshold, which may be the same first threshold (Th1), for a particular period of time (e.g., 200 nano-seconds). If the input power does not stay above this first threshold (Th1), the method returns back to the start up block. Alternatively, if the input power does stay above the threshold, the light source (e.g., laser, light emitting diode (LED), or other light source) is turned on.

Then, the method tests whether the input power is less than a second threshold (Th2). In some instances, this second threshold is −2 dBmV (i.e., Th1=−2 dBmV). If the input power stays below this second threshold (Th2), the method proceeds to test whether the Burst Timer is still less than a period of time (e.g., 12 μs). In some embodiments, each of the thresholds, Th1 and Th2, has a tolerance of ±3 dB for the MUST and MUST NOT requirements, since these are comparisons involving absolute signal power.

It is noted that the Burst Timer is not needed or used after it counts to 50 μs. The Burst Timer is used to determine when the light source has been turned on for at least 12 μs and for 50 μs. The Avg_Time depends on the Burst Timer passing these time durations.

If the Burst Timer is less than this period of time (e.g., 12 μs), the light source is turned off, and the method returns back to the start up block.

Alternatively, if the input power is above this second threshold (Th2), the method proceeds to test whether the Burst Timer is equal to this period of time (e.g., 12 μs). If the Burst Timer is not yet equal to this period of time (e.g., 12 μs), the method returns to test whether the input power is less than a second threshold (Th2). Alternatively, if the Burst Timer is in fact equal to or greater than this period of time (e.g., 12 μs), the method identifies a Qualified Burst Mode, and the Qualified Burst Mode is set to be "on". It is noted that Qualified Signal Threshold (QST) is updated after each qualified burst. The QST is undefined when a particular period of time (e.g., 30 seconds) or more have elapsed without a qualified burst. The Qualified Burst Mode is set to be "on" depending on the Burst Timer reaching 12 μs.

The average time is set to 12 μs. The Burst Transmission Level (BTL) is set to be the minimum of the average input power over the previous period of time (e.g., 12 μs) and a particular value (e.g., 60 dBmV). The BTL continually tracks the input power averaged over the preceding Avg_Time seconds. At this point, the method operates in a second power mode (depicted by β).

In some embodiments, the threshold test related to offsets from BTL and QST (e.g., those that subtract some amount there from) have a tolerance of ±1.5 dB for the MUST and MUST NOT requirements, since these are comparisons involving relative signal power of bursts currently or previously received.

If the Qualified Burst Mode is set to be "on", then the method tests whether the input power is less than a threshold that is defined by the Burst Transmission Level (BTL) minus (or offset by) some amount (e.g., BTL−21.5 dB). If the input power is not less than this threshold, then the method return back to this test.

However, if the input power is less than BTL−21.5 dB, then the light source is turned off, and the Qualified Burst Mode is set to be "off". QST is then set to be the maximum of the BTL and a particular value (e.g., 30 dBmV). The QST_timer is set to 0 and started (i.e., the QST_timer_secs is set to 0). The QST_timer operates by counting time from the end of the most resent Qualified Burst and decrementing QST. The method continues to operate in the first power mode (depicted by α), QST is set to the maximum of BTL and some value (e.g., 30 dBmV), the Avg_Time and Burst Timer are disabled, and the method goes to STATE B (e.g., as depicted in the method of FIG. 22, FIG. 23, and FIG. 24).

FIG. 22, FIG. 23, and FIG. 24, considered together using reference numerals 2201, 2202, and 2003, illustrate an alternative embodiment of a method for performing signal detection in accordance with optical transmitters.

These diagrams (FIG. 22, FIG. 23, and FIG. 24) illustrate an embodiment of operation that is performed when a Qualified Burst has in fact been identified or detected within a previous period of time (e.g., within previous 30 seconds). These diagrams also illustrate the transition to absolute threshold operation for turn on when there has been an absence of a Qualified Burst for a period of time.

The method of these diagrams (FIG. 22, FIG. 23, and FIG. 24) may be considered as performing simultaneous operations in both the vertical and horizontal axes. The vertical axis is shown in FIG. 22 and FIG. 23, and the horizontal axis is shown in FIG. 24. This parallel, simultaneous operation of these two axes involves analyzing various input power test, except during presence of a Qualified Burst, wherein the loop is not operating, as indicated in TEST C of FIG. 24.

The method of these diagrams begins in STATE B. The device is initialized (with QST being defined at this point), and operates in the first power mode (depicted by α).

Describing the operation of the vertical axis of this method, it is then tested whether the input power is greater than a threshold that is defined by the defined QST minus (or offset by) some particular amount (e.g., QST−29.5 dB). If the input power is less than this threshold, then the method returns back to the initialization block.

Alternatively, if the input power is greater than QST−29.5 dB, then the method tests whether the input power stays above a threshold, which may be the same value of QST−29.5 dB, for a particular period of time (e.g., 200 nano-seconds). If the input power does not stay above this threshold (QST−29.5 dB), the method returns back to the initialization block. Alternatively, if the input power does stay above the threshold, the light source (e.g., laser, light emitting diode (LED), or other light source) is turned on. The average time is set to 12 μs. The Burst Transmission Level (BTL) is set to be the minimum of the average input power over the previous period of time (e.g., 12 μs) and a particular value (e.g., 60 dBmV). At this point, the method operates in the second power mode (depicted by β).

Then, the method tests whether the input power is less than the second threshold (Th2) or whether the input power is less than a threshold that is defined by QST minus (or offset by) some particular amount (e.g., QST−33.5 dB). The MUST turn-off condition for this test (Y) is <−5 dBmV OR <QST−35 dB while the MUST NOT turn-off condition for this test (N) is >+1 dBmV AND >QST−32 dB. If either one or both of these conditions is met (e.g., is either <test is Y, then turn-off; otherwise, stay on), then the method proceeds to test whether the Burst Timer is still less than a period of time (e.g., 12 μs). If the Burst Timer is less than this period of time (e.g., 12 μs), the light source is turned off, and the method returns back to the start up block.

Alternatively, if the input power is above this second threshold (Th2) or above the amount of QST−33.5 dB, the method proceeds to test whether the Burst Timer is equal to this period of time (e.g., 12 μs). If the Burst Timer not yet equal to this period of time (e.g., 12 μs), the method returns to test whether the input power is less than a second threshold (Th2). Alternatively, if the Burst Timer is in fact equal to or greater than this period of time (e.g., 12 μs), the method identifies a Qualified Burst Mode, and the Qualified Burst Mode is set to be "on".

If the Qualified Burst Mode is set to be "on", then the method tests whether the input power is less than a threshold that is defined by the Burst Transmission Level (BTL) minus (or offset by) some amount (e.g., BTL−21.5 dB). If the input power is not less than BTL−21.5 dB, then the method return back to this test.

However, if the input power is less than this threshold (e.g., BTL−21.5 dB), then the light source is turned off, and the Qualified Burst Mode is set to be "off". QST is then set to be the maximum of the BTL and a particular value (e.g., 30 dBmV). The QST_timer is set to 0 and reset (i.e., the QST_timer_secs is set to 0).

The method continues to operate in the first power mode (depicted by α), QST is set to the maximum of QST−1, BTL, and some value (e.g., 30 dBmV), the Avg_Time and Burst Timer are disabled, and the method goes to STATE B (e.g., as depicted in the method of FIG. 22, FIG. 23, and FIG. 24).

Describing the operation of the horizontal axis of this method, the method tests both of whether the QST timer is less than the current value of the QST_timer_secs+1 and whether a Qualified Burst Mode has been identified (e.g., whether the Qualified Burst Mode is set to be "on"). If both of these conditions are met, then the method returns to the initialization block. Alternatively, if at least one of these conditions is not met, then the method increments the current value of the QST_timer_secs (i.e., adds 1 to the current value of the QST_timer_secs). The QST is then set to be the maximum of QST minus 1 or particular value (e.g., 30 dBmV).

Then, the method test whether the current value of the QST_timer_secs is greater than some value (e.g., 30 seconds). If it is, then the method disables the QST_timer, and sets the QST value to be undefined, and the method then returns to STATE A (e.g., as depicted in specifically in FIG. 20 of the method shown by FIG. 20 and FIG. 21). Alternatively, if the current value of the QST_timer_secs is not greater than the value (e.g., 30 seconds), the method then returns to STATE B.

Also, among the various thresholds employed in these diagrams, certain ones are employed when operating in the first power mode (depicted by α), and others are employed second power mode (depicted by β).

For example, the thresholds TH1−18 dBmV and QST−29.5 dBmV are employed when operating in the first power mode (depicted by α). The thresholds TH2−(−2) dBmV, BTL−21.5 dBmV, and QST−33.5 dBmV are employed second power mode (depicted by β). While certain values for the offsets are employed in these embodiments (e.g., 18, 29.5, −2, etc.), it is noted that other offset values may alternatively be employed without departing from the scope and spirit of the invention. Generally speaking, only two of the thresholds are employed at any given time.

Again, the BTL (Burst Transmission Level) continually tracks the input power averaged over the preceding Avg_Time seconds. The Qualified Signal Threshold (QST) is set by Burst Transmission Level of a recently "qualified" burst, and it is adjusted (e.g., reduced) as time since last burst increases. There are two modes for measuring input power for setting Burst Transmission Level: (1) Avg_Time=12 μsec: burst duration of at least 12 μsec, less than 50 μsec, and (2) Avg_Time=50 μsec: burst duration of at least 50 μsec.

In one embodiment, the tolerances of thresholds against input power are as follows:

TH1−18 dBmV±3 dB
TH2−(−2) dBmV±3 dB
BTL−21.5 dBmV±1.5 dB
QST−29.5 dBmV±1.5 dB
QST−33.5 dBmV±1.5 dB

It is noted that the signal and threshold levels are all exemplary, and in general may change as more and less insertion loss is included in the paths from the modems to the electrical-to-optical converter, and/or as more or less power is needed at the receiver at the output of the optical-to-electrical converter.

In accordance with the various principles presented herein, robust and reliable turn on decisions are provided not only in the presence of additive white Gaussian noise (AWGN), but also in the presence of impulse or burst noise. Detectors that rely only on an instantaneous power level, or that rely on an average power level, have difficulty with strong impulse noise, since a strong impulse (or short burst) will impact the average power (or low pass filtered power) for a long time, until the averaging window (filter impulse response) diminishes to negligible. Even logarithmic scaling, or other conversion, cannot mitigate false detection on a strong input impulse or short burst as effectively as the finite duration averaging window of one embodiment. By combining a finite duration averaging window with a plurality of post-averaging threshold tests, robust turn on decisions are achieved in the presence of AWGN without false turn on due to strong short bursts or impulse noise. By setting the averaging window to have a (for all practical purposes) negligible impulse response after a given amount of time the detector just described is able to fully mitigate an impulse or burst no matter how strong. By controlling the impulse response of the averaging filter to be less than a given amount, for example Htd, after a certain amount of time, td, impulse or burst noise of a level up to the inverse of $|Htd|^2$ is fully mitigated. By setting the post-averaging threshold tests to require a continuous (or consecutive number of samples corresponding to an) amount of time which exceeds Burst Duration+td, where td is the duration of the averaging window up to the point where the window response diminishes to (practically) negligible, the turn on detector is guaranteed to mitigate false turn on in the presence of such a burst noise event. Thus, the parameters in accordance with the various principles presented herein can be adjusted to mitigate burst noise with characteristics which are most problematic in a given location or application. For example, if troublesome burst noise events in a given location are known to have a duration of Bd almost all the time, and if "td" provides averaging of the signal variations and AWGN which is suitable, then the post-averaging threshold testing can be shortened to a duration of just a little beyond Bd+td. If longer burst noise events become more frequent, then the post-averaging threshold testing can be increased accordingly. Such an adaptive detector provides for reliable turn on even in a variety of applications.

In accordance with the various principles presented herein, setting the turn on threshold based on previous RF inputs is provided (in other embodiments any type of signal may be triggering a turn on of any kind of device, not necessarily an RF signal turning on an optical transmitter). Advantages of turning on the optical transmitter based on previous inputs have been listed previously herein. Of note in accordance with the various principles presented herein, the adaptive threshold herein has the desired quality of requiring that the inputs which trigger turn ons must be "qualified" before they are allowed to impact the adaptive threshold(s). This qualification prevents an erroneous burst noise or other signal which may "falsely" trigger turn on from impacting future valid turn ons by pushing the adaptive turn on threshold too high, speciously. Additionally, in accordance with the various principles presented herein, the use of a qualified signal level (or equivalent by any other name) may be employed, which is used as one of the components of future turn on decisions and possibly as a component of future turn off decisions.

Similarly, adaptive turn off is presented herein, with similar features of establishing a "qualification" which will be useful to prevent unwanted turn off of a continuing valid signal, and teaching using longer averaging time for setting the qualified signal level of the valid input signal as the input signal duration is longer versus more brief. A "signal" which triggers turn on but is unduly brief is determined to be not qualified and does not impact future turn on or subsequent turn off decisions.

In addition to the adaptive component of adaptive turn on and turn off decisions, absolute thresholds are also used in one or both such decisions, in one embodiment, further mitigating damage or negative consequences caused by erroneous setting of qualified signal level.

In addition to the mitigation of strong impulse or burst noise, operation in AWGN, and operation with signals with varying envelope power, and varying symbol rates, various aspects herein teach mitigation of ingress interference in influencing turn on and turn off decisions. In previous patent application (incorporated by reference herein as cited above), various embodiments of ingress mitigation may be performed.

In accordance with the various principles presented herein, the learning and characterization of ingress noise may be performed, in one embodiment, as taught in one of the patent applications that has been incorporated by reference herein as cited above and entitled, "System and method for canceling interference in a communication system", with the modifications a) the noise power spectral density of the entire upstream spectrum is characterized, and not just the spectrum in one signaling channel; b) the ingress cancellation filter operates on the entire upstream spectrum and not just on one signaling channel; and c) instead of operating the sampling and delays of the ingress cancellation filter at symbol spacing, the sampling and delays of the ingress cancellation filter in this application correspond to a sampling rate which is at least satisfying the Nyquist criterion for the upstream spectrum. Sampling rates such as 100 MHz for a 5 to 42 MHz upstream will satisfy the Nyquist criterion with sufficient filtering ahead of a sampler. 200 MHz would be more than enough sampling rate for a 5-42 MHz upstream and would be sufficient for 5-85 MHz upstreams as well. In the absence of the ingress cancellation filter a sampling-based implementation would not have to have such a high sampling rate.

Application of an ingress cancellation filter which notches one or more ingress frequencies will add delay to the processing, so a corresponding delay may be warranted in the signal path. Such a delay could be provided in one embodiment in a path separate from the sampled path with the ingress cancellation filter. In another embodiment a splitter is used such that the RF signal modulating the optical carrier is not passed through the ingress cancellation filter, and compensating delay is provided in the RF signal path to the optical carrier. In one embodiment the upstream spectrum is characterized at the headend and the ingress cancellation filter coefficients are communicated to the RONU. In this embodiment the upstream signal to the RF burst receiver does not have the RONU-based ingress cancellation filter in its path. Whether or not the upstream spectrum for the ingress cancellation is characterized at the RF burst receiver or within the RONU, it is generally necessary to avoid training the spectrum characterization on spectrum captures which include valid upstream signals (i.e., those signals which are intended to modulate the optical carrier and be sent to the RF receiver). The discarding of spectrum captures which have spectral characteristics which are not suitable to mitigation with the ingress canceller are taught in the aforementioned patent, and could be used for avoidance of training on spectrum captures containing valid signals. The mask function disclosed in one of the patent applications that has been incorporated by reference herein as cited above and entitled, "System and method for canceling interference in a communication system", is useful in one embodiment for maintaining mitigation of known or previously learned ingress. Avoiding training on spectrum captures containing valid signals is also facilitated in one embodiment by characterizing the upstream ingress spectrum at the upstream RF receiver. In such an embodiment the ingress canceller coefficients are generally computed at the headend and communicated to the RONU. The RONU sample rate and ingress cancellation filter length should be known to the headend to support this embodiment.

While a communication link to the RONU which can pass filter coefficients could possibly be used to signal the RONU to turn on and turn off in coordination with the commands to the upstream transmitters themselves, a link to the RONU for setting filter coefficients, and possibly other RONU parameters, requires little or no synchronization with the upstream MAPS, and thus is simpler to implement and utilize.

In other embodiments the upstream ingress spectral characterization may be performed within the RONU. In one version of this embodiment the headend can signal the RONU and set up an initialization process. By providing a reset signal to the RONU and commanding the RF transmitters feeding the RONU to be quiet, for a time sufficient for the RONU to train on ingress, the RONU can mitigate any ingress present which would be falsely causing the RONU to turn on. During the training time the RONU will not be using the turn on signal to mitigate spectrum characterization. One embodiment may provide for the RONU to allow turn on during this time, and another embodiment would disallow turn until the ingress canceller is fully trained and operating.

In one embodiment if the RONU is triggered on for a period of time longer than a preset value, then the RONU enters into an ingress characterization mode, under the assumption that a lengthy false trigger may be occurring due to ingress.

By providing a quiet time for the RF transmitters feeding the RONU input, along with a set decay time built into the RONU spectral characterization, any training by the RONU which inadvertently captures signal spectrum can be flushed. By draining or decaying the spectrum capture, as taught in the U.S. Patent, overestimation of ingress power within the upstream band will not persist indefinitely.

It is noted that the various modules and/or circuitries (e.g., encoding modules, decoding modules, optical transmitter modules, interface modules, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc. within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As may be used herein, any use of such terms such as "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. It will be obvious to one of average skill in the art that various changes and modifications may be practiced within the spirit and scope of the invention, as limited only by the scope of the appended claims.

What is claimed is:

1. An apparatus, comprising:
an input to receive an electrical signal;
an optical transmitter module to control turning on and turning off of a light source based on the electrical signal, the light source to launch a pulsed on/off optical signal via an optical communication link; and wherein:
the optical transmitter module to analyze the electrical signal; and
based on the analysis of the electrical signal during a plurality of turn-on epochs, such that each of the plurality of turn-on epochs corresponds to a respective one of a plurality of operational states corresponding to transition of the optical transmitter module from off-state to steady-state with at least one additional operational state there between, in accordance with a plurality of turn-on parameters and based on the analysis of the electrical signal during a plurality of turn-off epochs in accordance with a plurality of turn-off parameters, the optical transmitter module selectively to turn on and to turn off the light source to launch the pulsed on/off optical signal via the optical communication link.

2. The apparatus of claim 1, wherein:
the plurality of turn-on epochs including three turn-on epochs; and
the plurality of turn-off epochs including two turn-on epochs.

3. The apparatus of claim 1, wherein:
the optical transmitter module to perform averaging of power of the electrical signal over a time window having a finite duration impulse response and having a finite memory to determine energy associated with the electrical signal.

4. The apparatus of claim 1, wherein:
based on a history corresponding to the electrical signal, the optical transmitter module to perform averaging of power of the electrical signal over:
a first time window having a first finite duration impulse response and having a first finite memory to determine energy associated with the electrical signal; or
a second time window having a second finite duration impulse response and having a second finite memory to determine energy associated with the electrical signal.

5. The apparatus of claim 1, wherein:
based on a history corresponding to the electrical signal, the optical transmitter module adaptively to modify at least one parameter of the plurality of turn-on parameters and the plurality of turn-off parameters.

6. The apparatus of claim 5, wherein:
the adaptive modification of at least one parameter of the plurality of turn-on parameters and the plurality of turn-off parameters increasing robustness of the optical transmitter module to perform turning on and turning off the light source improperly in response to at least one of additive white Gaussian noise (AWGN) and impulse noise within the electrical signal.

7. The apparatus of claim 1, wherein:
the analysis of the electrical signal during the plurality of turn-on epochs being performed in accordance with the plurality of turn-on parameters before a qualified signal threshold, associated with the electrical signal, having been identified; and
the analysis of the electrical signal during the plurality of turn-on epochs being performed in accordance with at least one additional plurality of turn-on parameters after the qualified signal threshold, associated with the electrical signal, having been identified.

8. The apparatus of claim 1, further comprising:
at least one additional input to receive at least one additional electrical signal; and wherein:
the electrical signal corresponding to a first data signal;
the at least one additional electrical signal corresponding to a second data signal;
the optical transmitter module to perform electrical combining of the first data signal and the second data signal to control turning on and turning off of the light source based on both the electrical signal and the at least one additional electrical signal; and
the pulsed on/off optical signal being launched via the optical communication link corresponding to both the electrical signal and the at least one additional electrical signal.

9. The apparatus of claim 1, wherein:
the apparatus being a communication device; and
the communication device being operative within a cable communication system including at least one fiber-optic communication link.

10. An apparatus, comprising:
a first input to receive a first electrical signal corresponding to a first data signal;
a second input to receive a second electrical signal corresponding to a second data signal;
an optical transmitter module to perform electrical combining of the first data signal and the second data signal to control turning on and turning off of a light source based on the first electrical signal and the second electrical signal, the light source to launch a pulsed on/off optical signal via an optical communication link; and wherein:
the optical transmitter module to analyze the first electrical signal and the second electrical signal; and
based on the analysis of the first electrical signal and the second electrical signal during a plurality of turn-on epochs, such that each of the plurality of turn-on epochs corresponds to a respective one of a plurality of operational states corresponding to transition of the optical transmitter module from off-state to steady-state with at least one additional operational state there between, in accordance with a plurality of turn-on parameters and based on the analysis of the analysis of the first electrical signal and the second electrical signal during a plurality of turn-off epochs in accordance with a plurality of turn-off parameters, the optical transmitter module selectively to turn on and to turn off the light source to launch the pulsed on/off optical signal, corresponding to both the first electrical signal and the second electrical signal, via the optical communication link.

11. The apparatus of claim 10, wherein:
based on a history corresponding to the electrical signal, the optical transmitter module to perform averaging of power of the electrical signal over:

a first time window having a first finite duration impulse response and having a first finite memory to determine energy associated with the electrical signal; or a second time window having a second finite duration impulse response and having a second finite memory to determine energy associated with the electrical signal.

12. The apparatus of claim 10, wherein:

based on a history corresponding to the electrical signal, the optical transmitter module adaptively to modify at least one parameter of the plurality of turn-on parameters and the plurality of turn-off parameters.

13. The apparatus of claim 12, wherein:

the adaptive modification of at least one parameter of the plurality of turn-on parameters and the plurality of turn-off parameters increasing robustness of the optical transmitter module to perform turning on and turning off the light source improperly in response to at least one of additive white Gaussian noise (AWGN) and impulse noise within the electrical signal.

14. The apparatus of claim 10, wherein:

the analysis of the electrical signal during the plurality of turn-on epochs being performed in accordance with the plurality of turn-on parameters before a qualified signal threshold, associated with the electrical signal, having been identified; and the analysis of the electrical signal during the plurality of turn-on epochs being performed in accordance with at least one additional plurality of turn-on parameters after the qualified signal threshold, associated with the electrical signal, having been identified.

15. The apparatus of claim 10, wherein:

the apparatus being a communication device; and the communication device being operative within a cable communication system including at least one fiber-optic communication link.

16. A method for operating a communication device, comprising:

receiving an electrical signal;

analyzing the electrical signal; and based on the analysis of the electrical signal being performed during a plurality of turn-on epochs, such that each of the plurality of turn-on epochs corresponds to a respective one of a plurality of operational states corresponding to transition of an optical transmitter module from off-state to steady-state with at least one additional operational state there between, in accordance with a plurality of turn-on parameters and based on the analysis of the electrical signal during a plurality of turn-off epochs in accordance with a plurality of turn-off parameters, selectively turning on and turning off of a light source being implemented for launching a pulsed on/off optical signal via an optical communication link.

17. The method of claim 16, further comprising:

performing averaging of power of the electrical signal over a time window having a finite duration impulse response and having a finite memory thereby determining energy associated with the electrical signal.

18. The method of claim 16, further comprising:

based on a history corresponding to the electrical signal, performing averaging of power of the electrical signal over:

a first time window having a first finite duration impulse response and having a first finite memory thereby determining energy associated with the electrical signal; or a second time window having a second finite duration impulse response and having a second finite memory thereby determining energy associated with the electrical signal.

19. The method of claim 16, further comprising:

based on a history corresponding to the electrical signal, adaptively modifying at least one parameter of the plurality of turn-on parameters and the plurality of turn-off parameters; and wherein:

the adaptive modification of at least one parameter of the plurality of turn-on parameters and the plurality of turn-off parameters increasing robustness to performing turning on and turning off the light source improperly in response to at least one of additive white Gaussian noise (AWGN) and impulse noise within the electrical signal.

20. The method of claim 16, further comprising:

before a qualified signal threshold, associated with the electrical signal, having been identified, analyzing the electrical signal during the plurality of turn-on epochs in accordance with the plurality of turn-on parameters; and after the qualified signal threshold, associated with the electrical signal, having been identified, analyzing the electrical signal during the plurality of turn-on epochs in accordance with at least one additional plurality of turn-on parameters.

\* \* \* \* \*